United States Patent
Maeda et al.

(10) Patent No.: US 9,401,039 B2
(45) Date of Patent: Jul. 26, 2016

(54) IMAGE PROCESSING DEVICE, IMAGE PROCESSING METHOD, PROGRAM, AND INTEGRATED CIRCUIT

(75) Inventors: Masaki Maeda, Osaka (JP); Naoki Ootani, Osaka (JP); Kazuhiro Nomura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 537 days.

(21) Appl. No.: 13/636,437

(22) PCT Filed: May 17, 2012

(86) PCT No.: PCT/JP2012/003252
§ 371 (c)(1),
(2), (4) Date: Sep. 21, 2012

(87) PCT Pub. No.: WO2013/005365
PCT Pub. Date: Jan. 10, 2013

(65) Prior Publication Data
US 2013/0076749 A1 Mar. 28, 2013

(30) Foreign Application Priority Data
Jul. 1, 2011 (JP) .................................. 2011-147279

(51) Int. Cl.
*G06T 15/08* (2011.01)
*G06T 15/20* (2011.01)
*H04N 13/00* (2006.01)

(52) U.S. Cl.
CPC ............... *G06T 15/08* (2013.01); *G06T 15/205* (2013.01); *H04N 13/0011* (2013.01); *H04N 13/0022* (2013.01)

(58) Field of Classification Search
None
See application file for complete search history.

(56) References Cited

U.S. PATENT DOCUMENTS

| | | | |
|---|---|---|---|
| 8,666,146 B1 * | 3/2014 | Smolic et al. ................. | 382/154 |
| 2006/0193491 A1 * | 8/2006 | Nakamura et al. ............ | 382/100 |
| 2008/0137753 A1 * | 6/2008 | He .......................... | 375/240.24 |
| 2009/0115780 A1 * | 5/2009 | Varekamp et al. ............ | 345/419 |
| 2010/0188584 A1 * | 7/2010 | Liu et al. ....................... | 348/699 |
| 2010/0316284 A1 * | 12/2010 | Jeong et al. .................. | 382/162 |
| 2011/0074778 A1 * | 3/2011 | Turner et al. .................. | 345/420 |
| 2012/0162223 A1 | 6/2012 | Hirai et al. | |

FOREIGN PATENT DOCUMENTS

| | | |
|---|---|---|
| JP | 7-239951 | 9/1995 |
| JP | 8-140116 | 5/1996 |

(Continued)

OTHER PUBLICATIONS

Zhang, Guofeng, et al. "Consistent depth maps recovery from a video sequence." Pattern Analysis and Machine Intelligence, IEEE Transactions on 31.6 (2009): 974-988.*

(Continued)

*Primary Examiner* — Sultana M Zalalee
(74) *Attorney, Agent, or Firm* — Wenderoth, Lind & Ponack, L.L.P.

(57) ABSTRACT

A depth image conversion unit moves an edge location in an input depth image towards a background. A pixel shift unit generates an image from a different viewpoint by horizontally shifting coordinates of each pixel in an image based on a converted depth image. A pixel interpolation unit interpolates a missing pixel region yielded by pixel shifting.

17 Claims, 27 Drawing Sheets

(56) References Cited

FOREIGN PATENT DOCUMENTS

| JP | 3091622 | 9/2000 |
|---|---|---|
| JP | 2004-295859 | 10/2004 |
| WO | 2011/033668 | 3/2011 |

OTHER PUBLICATIONS

Lee, Sang-Beom, and Yo-Sung Ho. "Discontinuity-adaptive depth map filtering for 3D view generation." Proceedings of the 2nd International Conference on Immersive Telecommunications. ICST (Institute for Computer Sciences, Social-Informatics and Telecommunications Engineering), 2009.*

International Search Report issued Jun. 19, 2012 in International (PCT) Application No. PCT/JP2012/003252.

Christoph Fehn, "Depth-Image-Based Rendering (DIBR), Compression and Transmission for a New Approach on 3D-TV", Conference on Stereoscopic Displays and Virtual Reality Systems XI, Jan. 19-22, 2004, San Jose, CA, pp. 93-104.

* cited by examiner

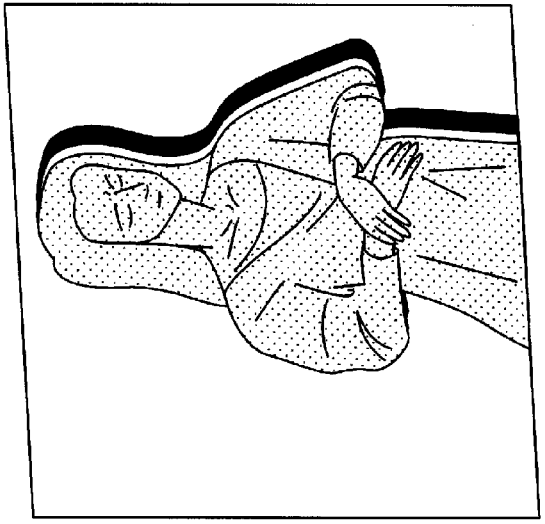
FIG. 7B
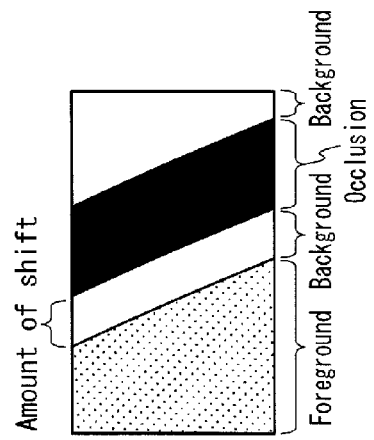
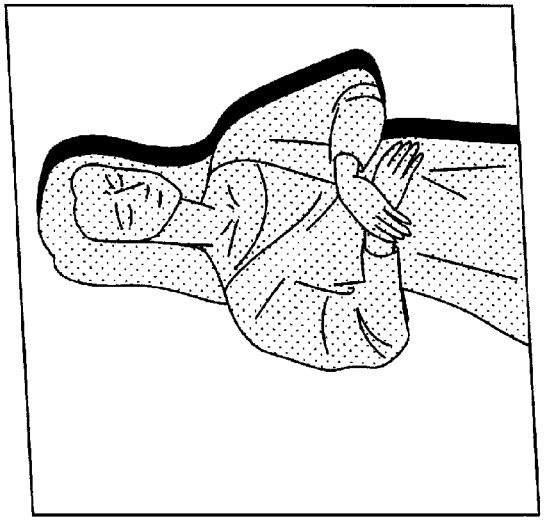
FIG. 7A
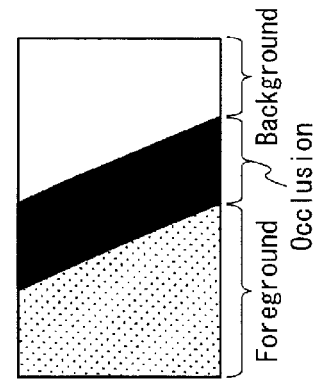

IMAGE PROCESSING DEVICE, IMAGE PROCESSING METHOD, PROGRAM, AND INTEGRATED CIRCUIT

TECHNICAL FIELD

The present invention relates to image processing technology, and particularly to technology for generating stereoscopic images.

BACKGROUND ART

DIBR (Depth-Image-Based Rendering) is known technology for generating stereoscopic images composed of images from multiple viewpoints by shifting the coordinates of pixels in an image horizontally to generate an image from a different viewpoint than the original image (see Non-Patent Literature 1).

When using DIBR, the horizontal shift amount is determined based on a depth image that indicates the depth of each object in an image. Since the shift amount differs between objects that are located towards the front (foreground objects) and objects that are located towards the back (background objects), a missing pixel region (occlusion) where no pixel values exist occurs in the image resulting after pixels are shifted. The missing pixel region occurs at the border region between a foreground object and a background object, i.e. along an edge at which depth values are discontinuous.

Patent Literature 1 discloses technology for filling in the missing pixel region with linear interpolation using pixels near the missing pixel region. Non-Patent Literature 1 discloses technology for reducing the size of the missing pixel region by smoothing, with a Gaussian filter, edges where the values of the depth image are discontinuous and for shifting pixels using the smoothed depth image.

CITATION LIST

Patent Literature

Patent Literature 1: Japanese Patent No. 3091622

Non-Patent Literature

Non-Patent Literature 1: Fehn Christoph, "Depth-Image-Based Rendering (DIBR), Compression and Transmission for a New Approach on 3D-TV"; Conference on Stereoscopic Displays and Virtual Reality Systems XI, Jan. 19-22, 2004 San Jose Calif.; p. 93-104

Technical Problem

With the above conventional technology, however, the stereoscopic image resulting from DIBR may appear unnatural.

SUMMARY OF INVENTION

The present invention has been conceived in light of the above problem, and it is an object thereof to provide an image processing device that allows for DIBR with a highly natural appearance.

Solution to Problem

In order to achieve the above object, an image processing device according to an aspect of the present invention is an image processing device for generating images from multiple viewpoints, by shifting coordinates of pixels in an original image, in order to provide depth indicated by a depth image composed of a pixel region formed by a plurality of pixels, a value of each pixel in the depth image indicating the depth of a corresponding pixel in the original image, the image processing device comprising: a depth image conversion unit configured to convert the depth image by searching within the pixel region composing the depth image for edge pixels that constitute an edge of an object and shifting, in a predetermined direction, coordinates of pixels in the depth image that are surrounded by the edge pixels; a pixel shift unit configured to generate a viewpoint image from a different viewpoint than the original image by calculating a parallax that provides the depth indicated by the depth image converted by the depth image conversion unit and shifting the coordinates of pixels in the original image by a number of pixels corresponding to the parallax; and a pixel interpolation unit configured to interpolate an occlusion, occurring due to pixel shifting, in the generated viewpoint image.

Advantageous Effects of Invention

The image processing device according to an aspect of the present invention moves an edge location where the depth value of the depth image is discontinuous, and based on the depth image with the moved edge location, shifts the coordinates of pixels in the original image, thus yielding a missing pixel region within a background object. The missing pixel region is therefore interpolated using pixels from the background object on either side, thereby preventing noticeable blurring and distortion of a foreground object.

While the background object portion becomes stretched out, as compared to foreground objects, background objects typically do not have a complex shape and exhibit little pixel change. Therefore, using background object pixels controls degradation of the overall image due to interpolation of the missing pixel region.

BRIEF DESCRIPTION OF DRAWINGS

FIG. 7A illustrates a missing pixel region when edge movement is not performed, and FIG. 7B illustrates a missing pixel region when edge movement is performed.

DESCRIPTION OF EMBODIMENTS

Figure 1:
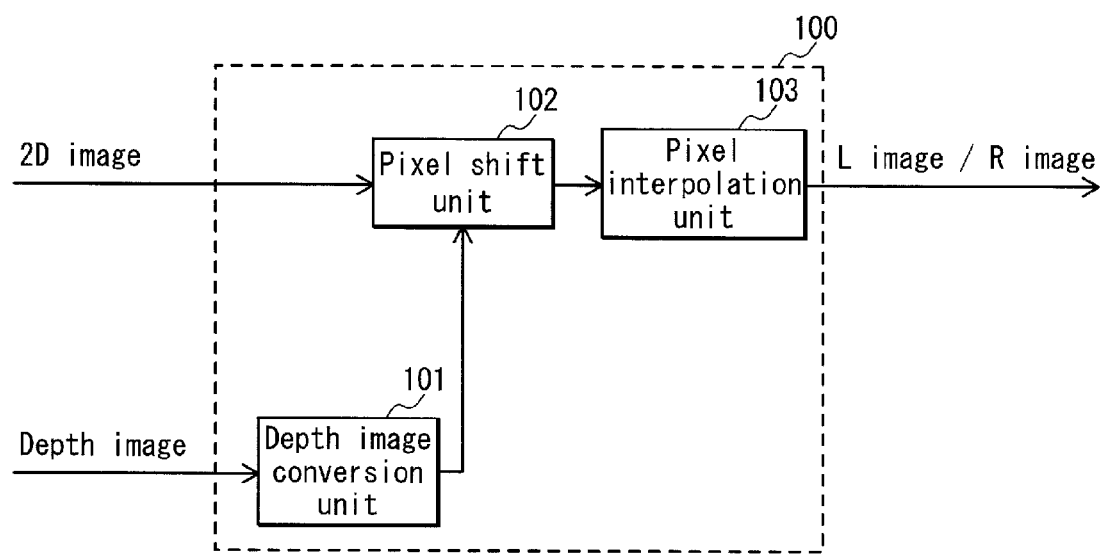
FIG. 1 is a block diagram illustrating an example of the structure of an image processing device 100 according to Embodiment 1.

Discovery Serving as a Basis for an Aspect of the Present Invention

First, the discovery serving as a basis for an aspect of the present invention is described.

With DIBR, a missing pixel region occurs at the boundary between a foreground object and a background object. Therefore, conventionally the missing pixel region occurring with DIBR is interpolated using the technology disclosed in Patent Literature 1 or Non-Patent Literature 1.

Through intense study, the inventors discovered that when using these technologies to interpolate the missing pixel region that occurs due to DIBR, the stereoscopic image resulting from DIBR may appear unnatural.

Specifically, when using the technology disclosed in Patent Literature 1 to interpolate the missing pixel region that occurs due to DIBR, pixels near the missing pixel region are used to interpolate the missing pixel region. Since the missing pixel region occurs at the border between a foreground object and a background object, the missing pixel region is interpolated with a color that is a linear interpolation between the foreground object and the background object. As a result, in the stereoscopic image after DIBR, the edge of the foreground object is stretched out, having a color that is intermediate between the foreground object and the background object. During stereoscopic display, the foreground object that seems to jump out of the display gets a viewer's attention. Blurring or distortion of the foreground object thus becomes prominent.

Furthermore, performing DIBR by smoothing, with a Gaussian filter, edges where the values of the depth image are discontinuous and then using the smoothed depth image allows for a reduction in the size of the missing pixel region. With this method, however, a missing pixel region occurs between a foreground object and a background object, where the depth values in the depth image change suddenly. It therefore becomes necessary to interpolate this missing pixel region, causing the foreground object to appear blurred and yielding a distorted stereoscopic image after interpolation.

Outline of an Aspect of the Present Invention

Based on the above discovery, the inventors arrived at the following aspects of the present invention.

An image processing device according to an aspect of the present invention is an image processing device for generating images from multiple viewpoints, by shifting coordinates of pixels in an original image, in order to provide depth indicated by a depth image composed of a pixel region formed by a plurality of pixels, a value of each pixel in the depth image indicating the depth of a corresponding pixel in the original image, the image processing device comprising: a depth image conversion unit configured to convert the depth image by searching within the pixel region composing the depth image for edge pixels that constitute an edge of an object and shifting, in a predetermined direction, coordinates of pixels in the depth image that are surrounded by the edge pixels; a pixel shift unit configured to generate a viewpoint image from a different viewpoint than the original image by calculating a parallax that provides the depth indicated by the depth image converted by the depth image conversion unit and shifting the coordinates of pixels in the original image by a number of pixels corresponding to the parallax; and a pixel interpolation unit configured to interpolate an occlusion, occurring due to pixel shifting, in the generated viewpoint image.

This aspect of the present invention moves an edge location where the depth value of the depth image is discontinuous, and based on the depth image with the moved edge location, shifts the coordinates of pixels in the original image, thus yielding a missing pixel region within a background object. The missing pixel region is therefore interpolated using pixels from the background object on either side, thereby preventing noticeable blurring and distortion of a foreground object.

While the background object portion becomes stretched out, as compared to foreground objects, background objects typically do not have a complex shape and exhibit little pixel change. Therefore, using background object pixels controls degradation of the overall image due to interpolation of the missing pixel region.

In the image processing device according to the above aspect of the present invention, between a foreground region and a background region separated by an edge in the depth image, the depth image conversion unit may shift the coordinates of the pixels surrounded by the edge pixels towards the background region.

This aspect of the present invention shifts the edge towards the background region, thus preventing the quality of the entire image from degrading due to interpolation of the missing pixel region.

The image processing device according to the above aspect of the present invention may further comprise a complexity calculation unit configured to calculate a degree of complexity of an object in the original image, wherein the depth image conversion unit converts the depth image under a condition that the degree of complexity of the background region is at most a predetermined value.

This aspect of the present invention performs edge movement only when the background object is not complex, but rather exhibits little pixel change, thereby preventing a complex background object from being stretched out and the quality of the entire image from degrading.

The image processing device according to the above aspect of the present invention may further comprise a complexity calculation unit configured to calculate a degree of complexity of an object in the original image, wherein the depth image conversion unit converts the depth image under a condition that the degree of complexity of the foreground region is higher than the degree of complexity of the background region.

This aspect of the present invention only moves the edge location towards the background when the foreground object is more complex than the background object, thereby preventing an object that is more complex than the foreground object from being stretched out and degrading image quality.

The image processing device according to the above aspect of the present invention may further comprise a complexity storage unit for storing a degree of complexity of the original image in a predetermined previous frame, wherein the depth image conversion unit converts the depth image under a condition that the degree of complexity of the foreground object in the original image in the predetermined previous frame is at least a predetermined value.

Frame by frame, this aspect prevents alternate display of a distorted image in which the foreground object is blurred by interpolation and a distorted image in which the background object is blurred by interpolation, thus preventing a degradation of quality of moving images due to flickering.

In the image processing device according to the above aspect of the present invention, the depth image conversion unit may search for the edge within the depth image by searching for a pixel whose depth value differs by at least a predetermined value from the depth value of a horizontally adjacent pixel.

This aspect of the present invention allows for searching for an edge in a depth image at the border between a foreground object and a background object, where the depth values in the depth image change suddenly.

The image processing device according to the above aspect of the present invention may further comprise a register for storing a parameter determining the edge within the depth image, wherein the depth image conversion unit searches for the edge within the depth image by comparing the difference from the depth value of the adjacent pixel with the parameter stored in the register.

This aspect allows for searching for the edge in the depth image by referring to a register inside the device.

The image processing device according to the above aspect of the present invention may further comprise an operation unit configured to receive user operations, wherein the parameter, stored in the register, that determines the edge within the depth image is set by user operations received by the operation unit.

This aspect allows for processing of images with an effect of depth image conversion as desired by the user.

The image processing device according to the above aspect of the present invention may further comprise a determination unit configured to determine a type of the original image data, wherein the parameter, stored in the register, that determines the edge within the depth image is based on the type of the original image data determined by the determination unit.

This aspect allows for processing of images with an effect of depth image conversion most appropriate for the type of object in an image.

In the image processing device according to the above aspect of the present invention, the depth image conversion unit may be further configured to smooth the pixels surrounded by the edge pixels after shifting the coordinates of the pixels surrounded by the edge pixels.

This aspect allows for reduction in the size of the missing pixel region yielded by pixel shifting. The target of pixel interpolation is thereby reduced, thus lessening the amount of image degradation due to pixel interpolation.

The image processing device according to the above aspect of the present invention may further comprise a register for storing a parameter determining a number of pixels by which to shift the coordinates of pixels in the depth image, wherein the depth image conversion unit shifts the coordinates of pixels in the depth image that are surrounded by the edge pixels by the number of pixels indicated by the parameter stored in the register.

This aspect allows for processing of images with an effect of depth image conversion as desired by the user.

The image processing device according to the above aspect of the present invention may further comprise a processing range selection unit configured to select an image range, within the depth image, over which to perform depth image conversion, wherein the depth image conversion unit converts the depth image over the image range selected by the processing range selection unit.

This aspect allows for generation of images from multiple viewpoints while performing edge movement over a designated image range.

An image processing method according to an aspect of the present invention is for generating images from multiple viewpoints by shifting coordinates of pixels in an original image in order to provide depth indicated in a depth image composed of a pixel region formed by a plurality of pixels, a value of each pixel in the depth image indicating the depth of a corresponding pixel in the original image, the image processing method comprising the steps of: converting the depth image by searching within the pixel region composing the depth image for edge pixels that constitute an edge of an object and shifting, in a predetermined direction, coordinates of pixels in the depth image that are surrounded by the edge pixels; generating a viewpoint image from a different viewpoint than the original image by calculating a parallax that provides the depth indicated by the depth image converted by the depth image conversion unit and shifting the coordinates of pixels in the original image by a number of pixels corresponding to the parallax; and interpolating an occlusion, occurring due to pixel shifting, in the generated viewpoint image.

This aspect provides an image processing method that prevents noticeable blurring and distortion of a foreground object due to interpolation.

A program according to an aspect of the present invention is for causing a computer to perform image processing for generating images from multiple viewpoints by shifting coordinates of pixels in an original image in order to provide depth indicated in a depth image composed of a pixel region formed by a plurality of pixels, a value of each pixel in the depth image indicating the depth of a corresponding pixel in the original image, the program causing the computer to perform the steps of: converting the depth image by searching within the pixel region composing the depth image for edge pixels that constitute an edge of an object and shifting, in a predetermined direction, coordinates of pixels in the depth image that are surrounded by the edge pixels; generating a viewpoint image from a different viewpoint than the original image by calculating a parallax that provides the depth indicated by the depth image converted by the depth image conversion unit and shifting the coordinates of pixels in the original image by a number of pixels corresponding to the parallax; and interpolating an occlusion, occurring due to pixel shifting, in the generated viewpoint image.

This aspect provides a program that prevents noticeable blurring and distortion of a foreground object due to interpolation.

An integrated circuit according to an aspect of the present invention is used in image processing for generating images from multiple viewpoints by shifting coordinates of pixels in an original image in order to provide depth indicated in a depth image composed of a pixel region formed by a plurality of pixels, a value of each pixel in the depth image indicating the depth of a corresponding pixel in the original image, the integrated circuit comprising: a depth image conversion unit configured to convert the depth image by searching within the pixel region composing the depth image for edge pixels that constitute an edge of an object and shifting, in a predetermined direction, coordinates of pixels in the depth image that are surrounded by the edge pixels; a pixel shift unit configured to generate a viewpoint image from a different viewpoint than the original image by calculating a parallax that provides the depth indicated by the depth image converted by the depth image conversion unit and shifting the coordinates of pixels in the original image by a number of pixels corresponding to the parallax; and a pixel interpolation unit configured to interpolate an occlusion, occurring due to pixel shifting, in the generated viewpoint image.

This aspect provides an integrated circuit that prevents noticeable blurring and distortion of a foreground object due to interpolation.

Embodiment 1

The following describes embodiments of the present invention with reference to the drawings.

Outline

An image processing device according to Embodiment 1 shifts the coordinates of each pixel in an image in a predetermined direction based on a depth image, thus generating an image from a different view than the original image. Before shifting pixels, the image processing device first shifts the edge location in the depth image towards the background, then shifts pixels using the depth image after edge location movement, subsequently interpolating a missing pixel region, yielded by the pixel shift, where no pixels exist. Since the image processing device moves the edge location in the depth image towards the background before shifting pixels, pixels on both sides of the missing pixel region are pixels from a background object, thus allowing for prevention of blurring and distortion of the foreground object due to interpolation of the missing pixel region.

Structure

First, the structure of an image processing device 100 according to Embodiment 1 is described. FIG. 1 is a block diagram illustrating an example of the structure of the image processing device 100. As illustrated in FIG. 1, the image processing device 100 includes a depth image conversion unit 101, a pixel shift unit 102, and a pixel interpolation unit 103. The following describes these components.

Depth Image Conversion Unit 101

The depth image conversion unit 101 has a function to move an edge location in an input depth image towards the background. Specifically, the depth image conversion unit 101 considers a pixel to be at an edge location if the depth of the horizontally adjacent pixel is at least a predetermined threshold. The depth image conversion unit 101 moves the edge location a predetermined number of pixels to the right.

Figure 2B:
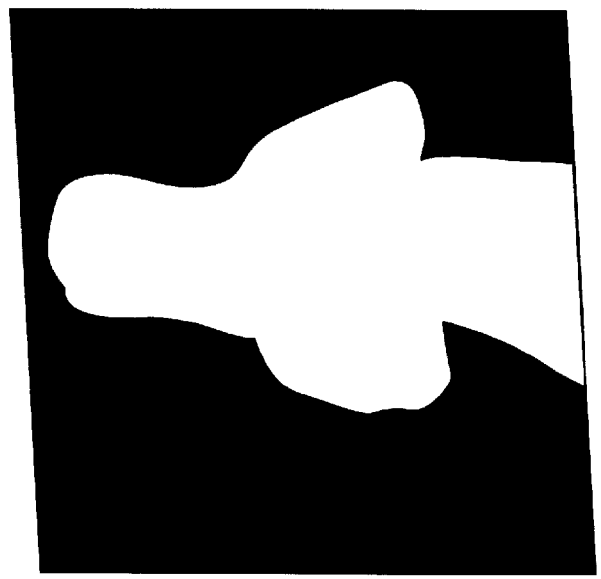
FIG. 2B illustrates a depth image that indicates the depth of each pixel in the image.
Figure 2A:
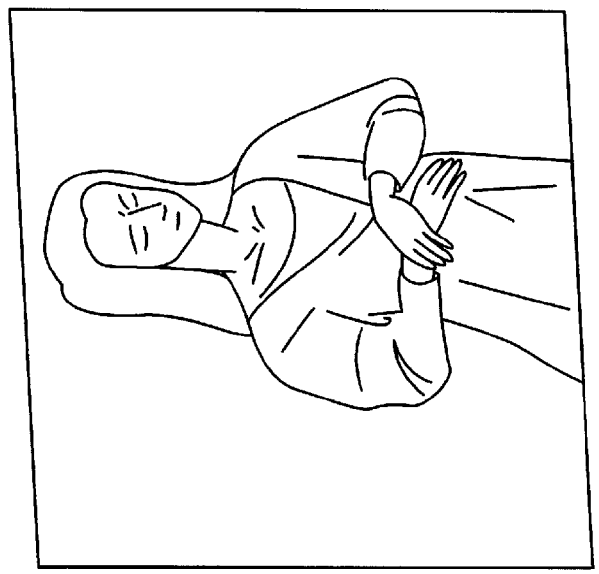
FIG. 2A is an example of an image that is input data for the image processing device 100.

FIG. 2A is an example of an image that is input data for the image processing device 100, and FIG. 2B illustrates a depth image that indicates the depth of each pixel in the image of FIG. 2A. The depth image is a grayscale image indicating the depth of each pixel as one of 256 levels of brightness, from 0 to 255. As a pixel is located closer to the front, the color is increasingly white, and as a pixel is located closer to the back, the color is increasingly black.

Within the depth image, the depth value changes along the border of each object in the image. The position at which the depth value changes suddenly is referred to as an edge location of the depth image. In the example shown in FIGS. 2A and 2B, the border between the person (foreground) and the background is an edge location.

Figure 3:
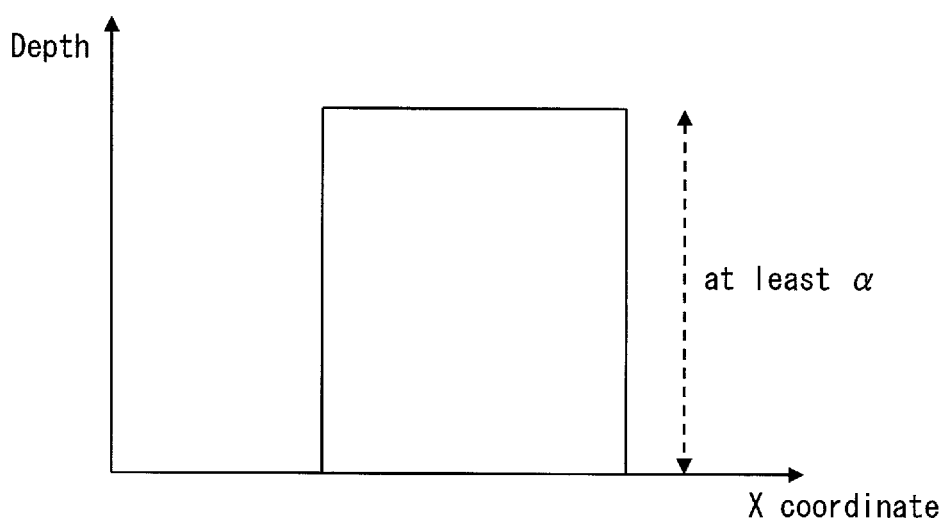
FIG. 3 illustrates the target of edge movement.

FIG. 3 illustrates the target of edge movement. The horizontal axis represents the depth value, and the vertical axis represents the x coordinate position. As illustrated in FIG. 3, the depth image conversion unit 101 performs edge movement if the difference between the depth value at the position of a pixel for processing and the depth value at the position of the pixel one pixel to the left of the pixel for processing is at least α.

The target of edge movement in the present embodiment is the right edge of the foreground object. The left edge of the foreground object is not targeted for edge movement. The reason is that the pixel shift unit 102, described below, shifts each pixel of the foreground object in the input image to the left in order to generate an image at a viewpoint that is displaced to the right with respect to the viewpoint of the input image, thereby generating a missing pixel region at the right edge of the foreground object. Since no missing pixel region occurs at the left edge of the foreground object, the left edge of the foreground object need not be moved.

Figure 4:
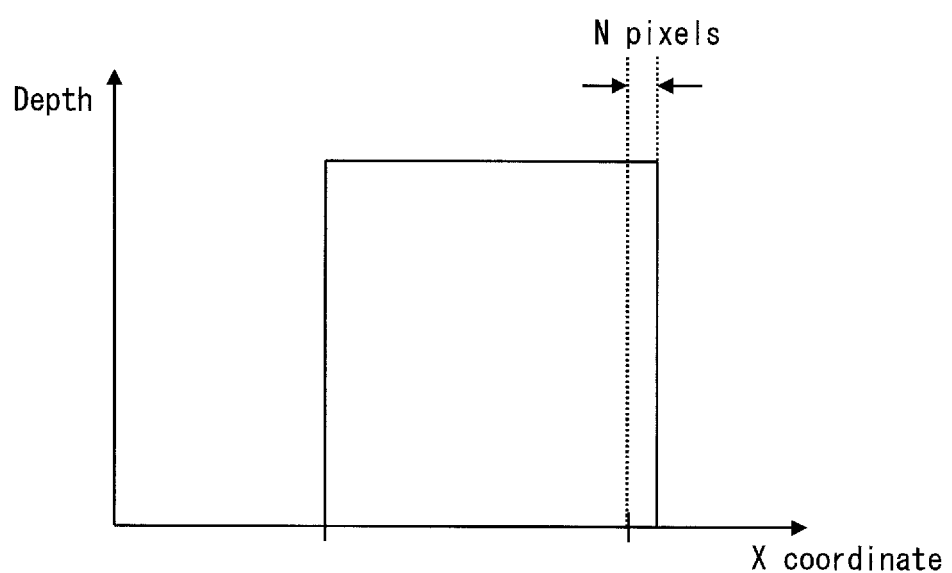
FIG. 4 illustrates movement of the edge location in the depth image.

FIG. 4 illustrates movement of the edge location in the depth image. As illustrated in FIG. 4, the depth image conversion unit 101 moves the identified edge location a predetermined number of pixels (N pixels) toward the background. Specifically, the depth image conversion unit 101 changes the depth value of N pixels adjacent to the pixel for processing to the depth value of the pixel for processing. In this context, "toward the background" refers to the region, among the two regions divided by the edge, with the smaller depth value. In other words, in the present embodiment which generates a right-view image by shifting pixels, the edge location is moved to the right.

Figure 5:
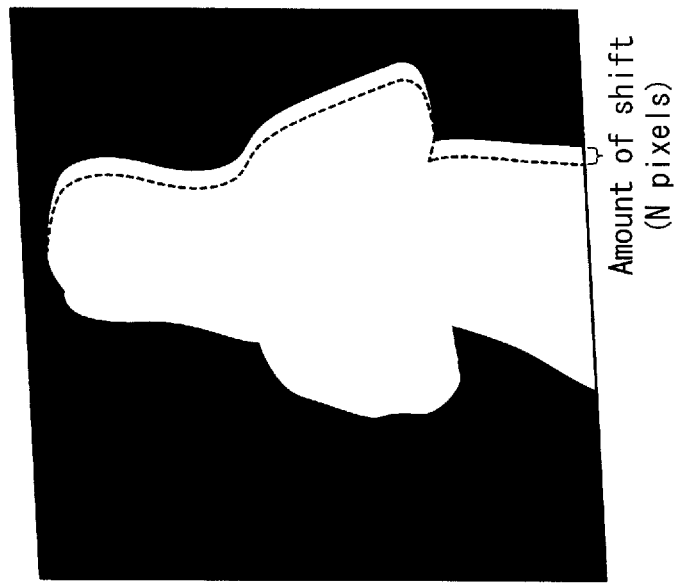
FIG. 5 illustrates the depth image after edge movement.

FIG. 5 illustrates the depth image after edge movement. As illustrated in FIG. 5, the depth image conversion unit 101 outputs a depth image in which the edge location at the right of the foreground object is moved horizontally by N pixels to the right (towards the background).

Pixel Shift Unit 102

The pixel shift unit 102 has a function to generate an image at a viewpoint that is displaced to the right with respect to the viewpoint of an input image by shifting the coordinates of the pixels in the input image based on the depth map output by the depth image conversion unit 101.

The pixel shift unit 102 also has a function to generate a missing pixel region flag that indicates, with a one-bit 0/1 flag, the position of a missing pixel region (occlusion), yielded by the pixel shift, where no pixels exist. Stereoscopic display can be achieved by displaying the input image as a left-view image and the image generated by the pixel shift as a right-view image. Details on the pixel shift are provided below.

Figure 6A:
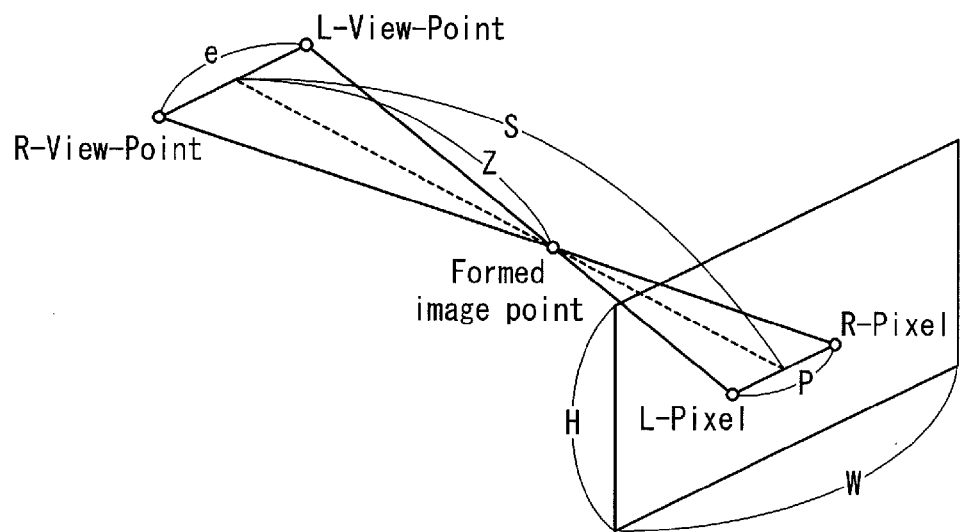
FIGS. 6A and 6B illustrate pixel shifting by a pixel shift unit 102.
Figure 6B:
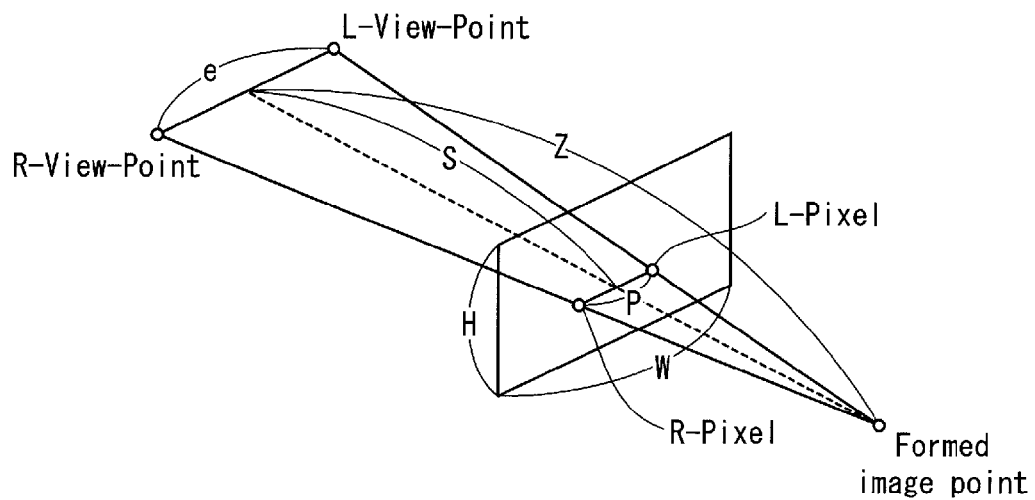

FIGS. 6A and 6B illustrate pixel shifting by the pixel shift unit 102. Stereoscopic effects include an effect to cause an object to jump forward (forward-jump stereoscopy) and an effect causing an object to be pulled back (pull-back stereoscopy). FIG. 6A shows the pixel shift for forward jump stereoscopy, and FIG. 6B shows the pixel shift for pull-back stereoscopy.

In these figures, P indicates the horizontal shift amount, L-View-Point indicates the position of the left pupil, R-View-Point indicates the position of the right pupil, L-Pixel indicates the left-view pixel, R-Pixel indicates the right-view pixel, e indicates the interpupillary distance, H indicates the height of the display screen, W indicates the width of the display screen, S indicates the distance from the viewer to the display screen, and Z indicates the distance from the viewer to the formed image point, i.e. the distance to the object in the depth direction. A straight line connecting the left-view pixel L-pixel and the left pupil L-view-point is the line of sight of the left pupil L-view-point. A straight line connecting the right-view pixel R-pixel and the right pupil R-view-point is the line of sight of the right pupil R-view-point. These lines of sight are achieved by 3D glasses alternately transmitting and blocking light, or by a parallax barrier such as a lenticular lens.

First, forward-jump stereoscopy is described. As illustrated in FIG. 6A, the relationship $P=e(1-S/Z)$ holds between the horizontal shift amount P, the distance Z from the object, the distance S from the viewer to the display screen, and the interpupillary distance e, based on the triangular scaling relationship between a triangle consisting of the left pupil L-view-point, the right pupil R-View-Point, and the formed image point, and a triangle consisting of the left pixel L-pixel, the right pixel R-pixel, and the formed image point. In the case of pull-back stereoscopy in FIG. 6B, the same relationship as described above holds. Based on the above expression, the pixel shift unit 102 calculates the shift amount for each pixel, shifting each pixel horizontally by a number of pixels corresponding to the calculated shift amount to generate the right-view image (R image).

Note that the distance Z from the object is acquired from the depth image. Furthermore, the average value of 6.5 cm for an adult male is used as the interpupillary distance e. The distance S from the viewer to the display screen is set to 3H, since the optimal viewing distance is typically three times the height of the display screen.

Pixel Interpolation Unit 103

The pixel interpolation unit 103 has a function to receive the missing pixel region flag output by the pixel shift unit 102 and interpolate the missing pixel region (occlusion) indicated by the missing pixel region flag. Specifically, the pixel interpolation unit 103 identifies a missing pixel region using the missing pixel region flag and performs linear interpolation on the identified missing pixel region using pixels near the missing pixel region.

Figure 8B:
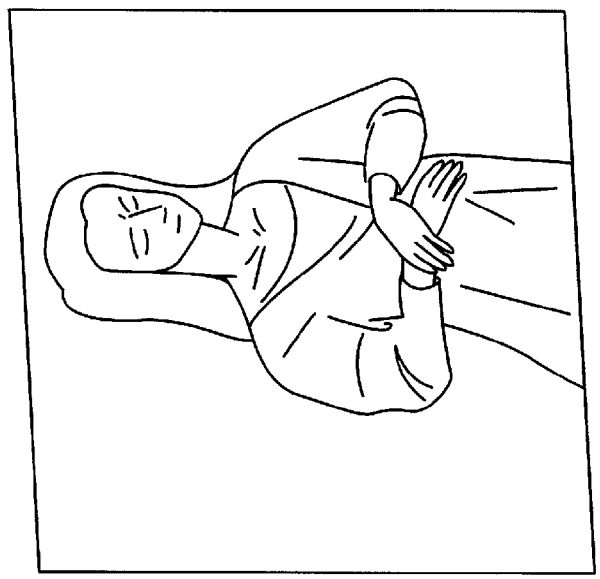
FIG. 8B illustrates an image when linear interpolation is performed on a missing pixel region on which edge movement has been performed.
Figure 8A:
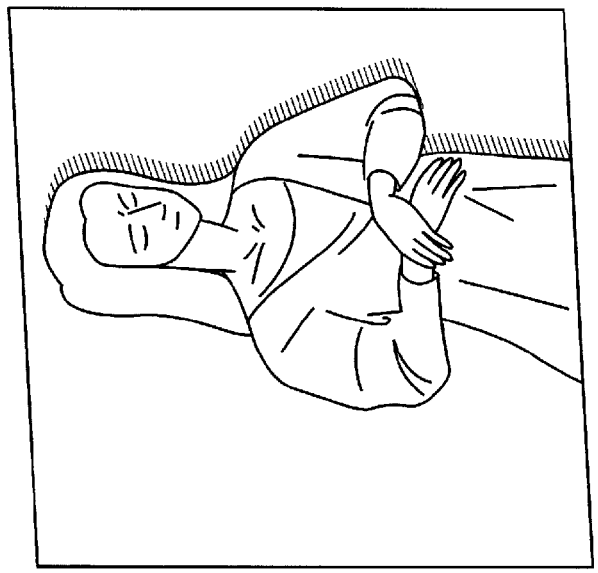
FIG. 8A illustrates an image when linear interpolation is performed on a missing pixel region on which edge movement has not been performed.

FIGS. 7A and 7B indicate a missing pixel region that occurs due to a pixel shift. FIG. 7A illustrates a missing pixel region when edge movement is not performed, and FIG. 7B illustrates a missing pixel region when edge movement is performed. FIGS. 8A and 8B illustrate images after pixel interpolation. FIG. 8A illustrates an image when linear interpolation is performed on the missing pixel region from FIG. 7A on which edge movement has not been performed, and FIG. 8B illustrates an image when linear interpolation is performed on the missing pixel region from FIG. 7B on which edge movement has been performed.

When edge movement is not performed, as shown in FIG. 7A, a missing pixel region occurs at the border between the foreground object and the background object. When performing pixel interpolation on such a missing pixel region, the missing region is interpolated with a color that is a linear interpolation between the foreground object and the background object. As a result, as shown in FIG. 8A, the edge of the foreground object is stretched out with an intermediate color, causing the edge of the foreground object to blur and yielding a distorted image.

Conversely, when performing edge movement, the missing pixel region is shifted a few pixels towards the background. As a result, as shown in FIG. 7B, the pixels at the edge of the missing pixel region belong to the background object. Therefore, when performing pixel interpolation on such a missing pixel region, the missing region is interpolated with a color that is a linear interpolation between pixels in the background object. Interpolating the missing pixel region using only pixels from the background object prevents the noticeable blurring and distortion upon interpolation of a foreground object. While the background object portion becomes stretched out, as compared to foreground objects, background objects typically do not have a complex shape and exhibit little pixel change. Therefore, using background object pixels controls degradation of the overall image due to interpolation of the missing pixel region and allows for generation of a high-quality image as shown in FIG. 8B.

This concludes the description of the structure of the image processing device 100. Next, operations by the image processing device 100 provided with the above structure are described.

Operations

View Image Generation

Figure 9:
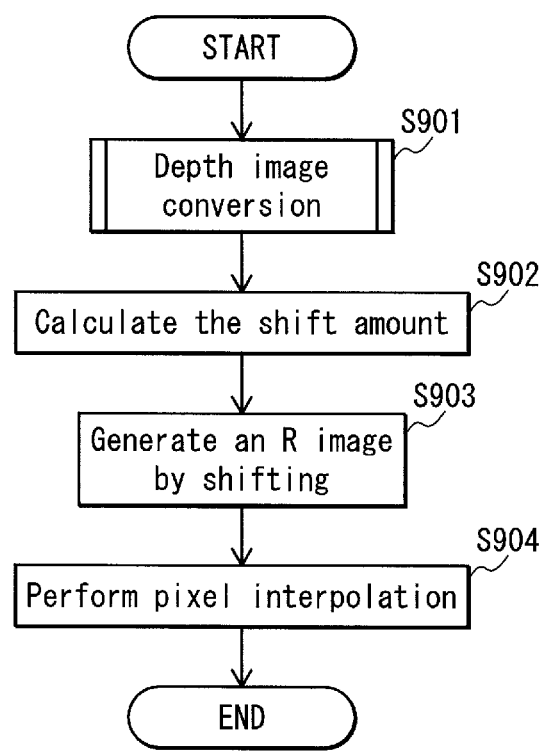
FIG. 9 is a flowchart illustrating the flow of viewpoint image generation.

First, viewpoint image generation by the image processing device 100 is described. FIG. 9 is a flowchart illustrating the flow of viewpoint image generation. As illustrated in FIG. 9, the depth image conversion unit 101 performs depth image conversion (step S901). Details on depth image conversion are provided below. Next, the pixel shift unit 102 calculates the shift amount (step S902). Specifically, the pixel shift unit 102 calculates the shift amount for each pixel based on the depth map converted in step S901 and using the expression $P=e(1-S/Z)$. The pixel shift unit 102 then generates an R image by shifting pixels based on the calculated shift amounts (step S903). After generating the R image, the pixel interpolation unit 103 performs linear interpolation on the missing pixel region produced by pixel shifting (step S904). This concludes the description of viewpoint image generation by the image processing device 100. Next, details on the depth image conversion of step S901 are provided.

Depth Image Conversion

Figure 10:
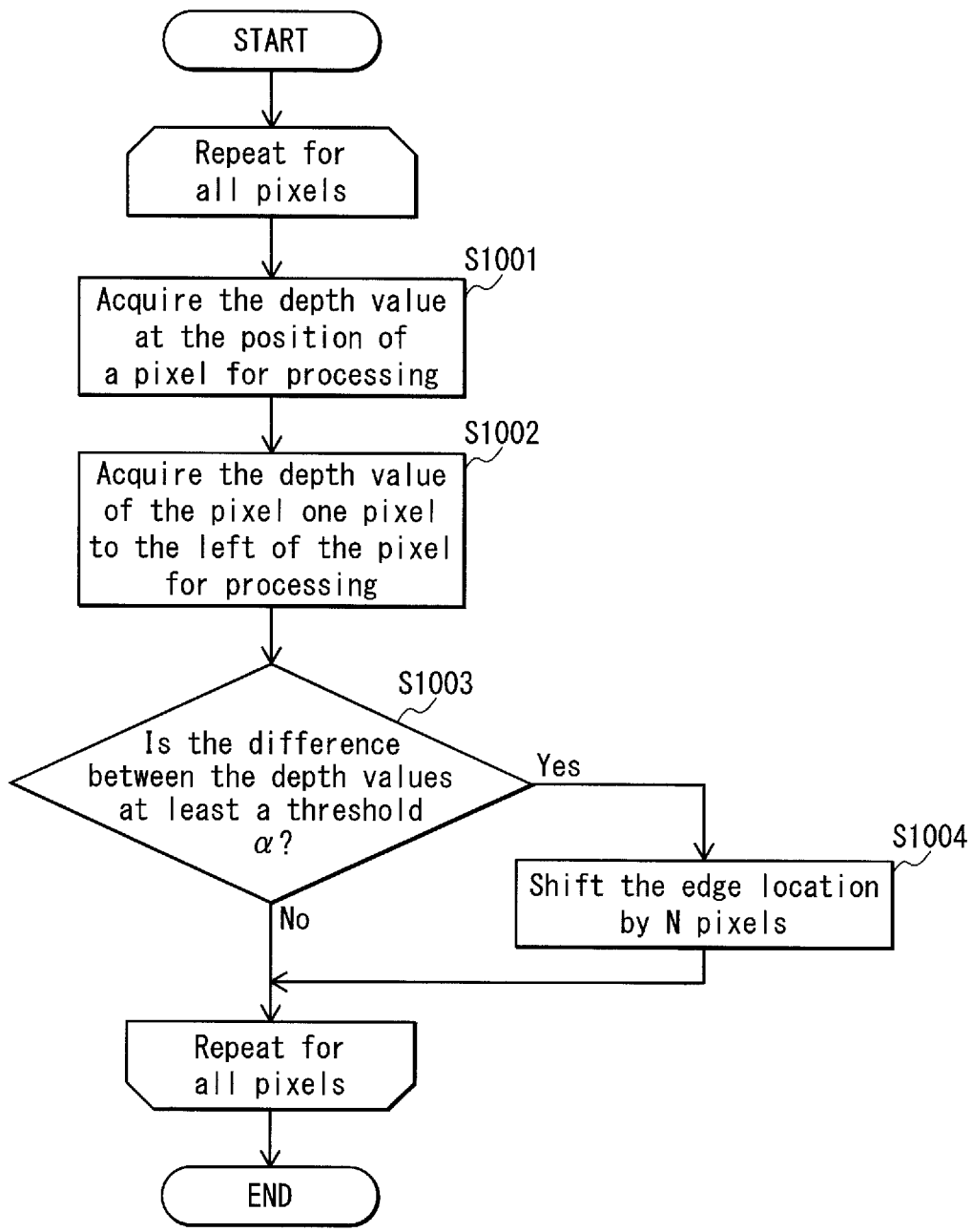
FIG. 10 is a flowchart illustrating the flow of depth image conversion.

FIG. 10 is a flowchart illustrating the flow of depth image conversion. As illustrated in FIG. 10, the depth image conversion unit 101 first acquires the depth value (A) at the position of a pixel for processing from the input depth image (step S1001). Next, the depth image conversion unit 101 acquires the depth value (B) at the position of the pixel one pixel to the left of the pixel for processing from the input depth image (step S1002).

The depth image conversion unit 101 then determines whether the difference between the depth value (B) at the position of the pixel one pixel to the left of the pixel for processing and the depth value (A) at the position of a pixel for processing is at least a predetermined threshold (a), i.e. whether $\alpha \leq B-A$ (step S1003). If the difference is at least a (step S1003, YES), the depth image conversion unit 101 shifts the edge location by N pixels (step S1004). If the difference is not at least α (step S1003, NO), the depth image conversion unit 101 does not shift the edge location for that pixel. The processing from step S1001 through step S1004 is repeated for all of the pixels in the image. This concludes the description of details regarding depth image conversion.

With the above embodiment, an edge location where the depth value of the depth image is discontinuous is moved, and based on the depth image with the moved edge location, the coordinates of pixels in the original image are shifted, yielding a missing pixel region having pixels from a background object on either side. Interpolating the missing pixel region using only pixels from the background object prevents the noticeable blurring and distortion upon interpolation of a foreground object. While the background object portion becomes stretched out, as compared to foreground objects, background objects typically do not have a complex shape and exhibit little pixel change. Therefore, using background object pixels controls degradation of the overall image due to interpolation of the missing pixel region.

Supplementary Explanation
Generation of Left-View Image

In the above embodiment, the input image is treated as the left-view image (L image), and the right-view image (R image) is generated by shifting pixels. The present invention is not, however, limited in this way. The input image may be the right-view image, and the left-view image may be generated by shifting pixels. In this case, the depth image conversion unit acquires the depth value (C) at the position of a pixel for processing and the depth value (D) at the position of the pixel to the left of the pixel for processing and shifts the edge location to the right by N pixels if the difference between the depth value (D) at the position of the pixel to the left of the pixel for processing and the depth value (C) at the position of a pixel for processing is at least a predetermined threshold (a), i.e. if $\alpha \leq D-C$.

Generation of Multi-View Images

In the above embodiment, generation of images from two views, a left-view image and a right-view image, is described, but the present invention is not limited in this way. A multi-view image from two or more views may be generated. In the present embodiment, the amount by which to shift a pixel is calculated taking into consideration the positional relationship between the left-viewpoint (L-View-Point) and the right-viewpoint (R-View-Point) illustrated in FIG. 6. When generating an image from a viewpoint other than the left-viewpoint/right-viewpoint, the amount by which to shift a pixel may be calculated taking into consideration a similar positional relationship between viewpoints, and pixels may then be shifted in order to generate an image corresponding to the viewpoints.

Implementation as a Line Scan Circuit

The image pixel shifting described in the above embodiment may be implemented as a line scan circuit. A line scan circuit is a hardware element that converts pixels into a digital video signal, reading and converting 1920 vertical pixels at a time from a group of pixels (1920×1080) for one screen that are stored in frame memory. Such a line scan circuit can be implemented by a line pixel memory that can store one line of pixel data, a filter circuit, and a converter circuit for parallel/serial conversion. The above-described pixel shifting is processing to convert the brightness of pixels in the depth image into parallax and then shift pixels. Moving the coordinates for one line of pixels, read into the line memory, from the entire image to the side by a number of pixels corresponding to the depth of the same line in the depth image associated with the entire image allows for generation of a parallax image from a different viewpoint that reflects each of the depths indicated by the depth image.

Generation of Depth Image

In the above embodiment, a 2D image and a depth image are input, and a left-view image and a right-view image are obtained by pixel shifting based on the depth image. The present invention is not, however, limited in this way. A left-view image and a right-view image may be input, and a depth image may be generated from the left-view image and the right-view image.

Figure 11:
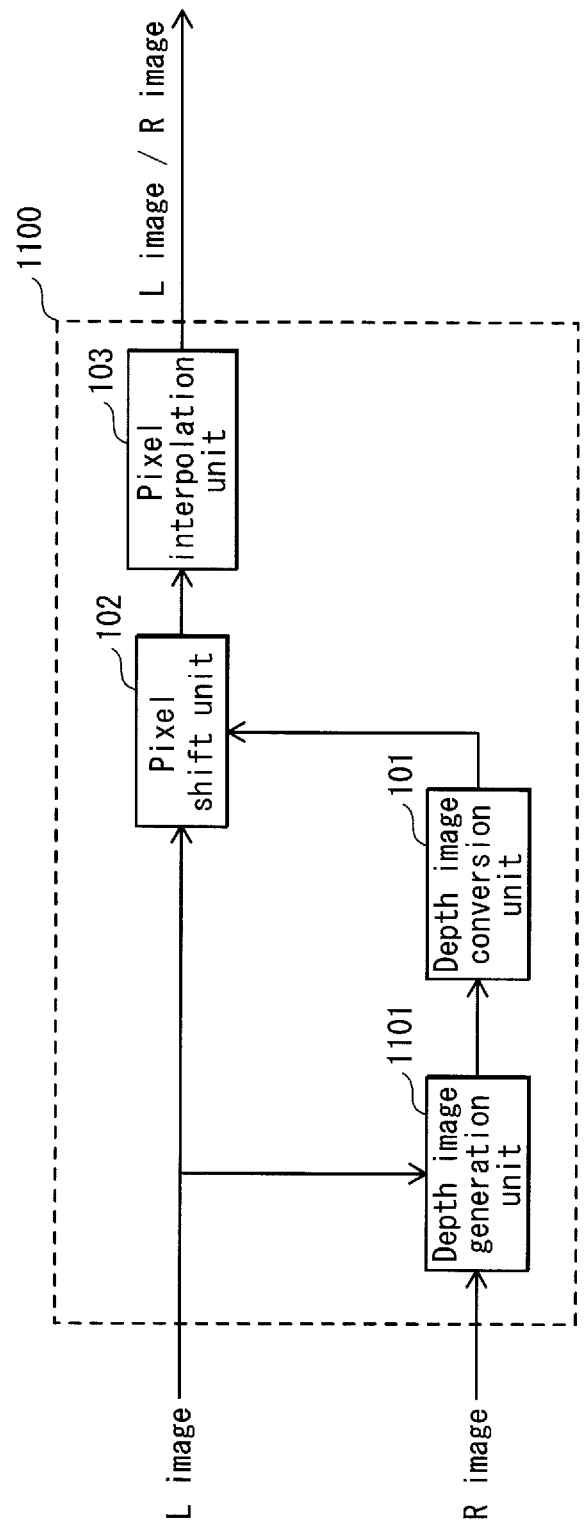
FIG. 11 is a block diagram illustrating an example of the structure of an image processing device 1100.

FIG. 11 is a block diagram illustrating an example of the structure of an image processing device 1100 that generates a depth image from a left-view image and a right-view image. As illustrated in FIG. 11, the image processing device 1100 includes a depth image generation unit 1101, depth image conversion unit 101, a pixel shift unit 102, and a pixel interpolation unit 103. The image processing device 1100 differs from the image processing device 100 illustrated in FIG. 1 by being provided with the depth image generation unit 1101, and in that the input data is a left-view image and a right-view image.

The depth image generation unit 1101 has a function to generate a depth image from a left-view image and a right-view image. Specifically, the depth image generation unit 1101 first searches for pixels corresponding between the left-view image and the right-view image. Based on the positional relationship between the corresponding points in the left-view image and the right-view image, the depth image generation unit 1101 then calculates the depth of objects using the principle of triangulation. The depth image is a grayscale image representing the depth of each pixel as an 8-bit brightness, and the depth image generation unit 1101 converts the calculated depth of objects into one of 256 levels, from 0 to 255. Note that methods for searching for corresponding points can largely be divided into two types: region-based matching and feature-based matching. Region-based matching establishes a small region around a point being focused on and searches based on intensity patterns of pixels within the region. Feature-based matching extracts features, such as edges, from an image and establishes the correspondences between features. Either searching method may be used.

The image processing device 1100 may instead calculate the depth by, after generating the depth image, changing the value indicated by the generated depth image. This allows for output of a left-view image and right-view image with a different stereoscopic degree than the stereoscopic image yielded by the input pair of a left-view image and right-view image.

When changing the stereoscopic degree by thus changing the values displayed by the depth image, the image processing device 1100 can prevent the played back stereoscopic image from appearing blurred or distorted.

Embodiment 2

Like the image processing device 100 according to Embodiment 1, the image processing device according to Embodiment 2 moves an edge location of the depth image towards the background, shifts pixels using the depth image after edge location movement, and subsequently interpolates a missing pixel region, yielded by the pixel shift, where no pixels exist. The image processing device according to Embodiment 2 differs from the image processing device 100 of Embodiment 1 by calculating the degree of complexity of a background pixel when performing processing for edge location movement, only moving the edge location under the condition that that the degree of complexity of the background pixel does not exceed a predetermined threshold. Edge movement is performed only when the background object is not complex, but rather exhibits little pixel change, thereby preventing a complex background object from being stretched out and the quality of the entire image from degrading.

Figure 12:
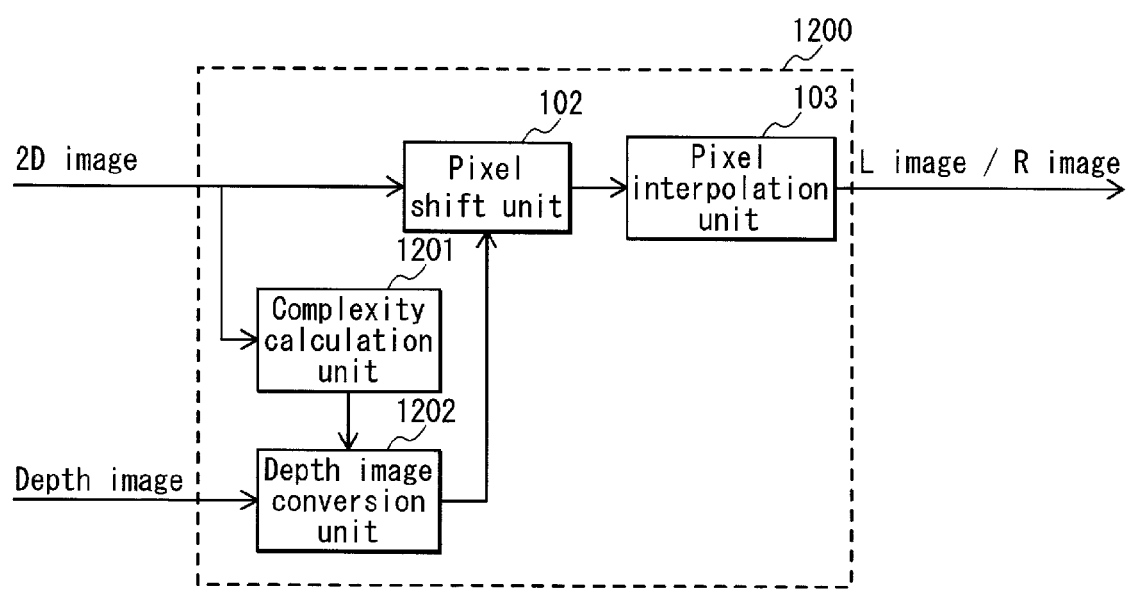
FIG. 12 is a block diagram illustrating an example of the structure of an image processing device 1200 according to Embodiment 2.

FIG. 12 is a block diagram illustrating an example of the structure of an image processing device 1200 according to Embodiment 2. Components having the same structure as the image processing device 100 of Embodiment 1 illustrated in FIG. 1 are provided with the same labels. As illustrated in FIG. 12, the image processing device 1200 includes a complexity calculation unit 1201, a depth image conversion unit 1202, a pixel shift unit 102, and a pixel interpolation unit 103.

The complexity calculation unit 1201 has a function to calculate the degree of complexity of each pixel in an image. Specifically, the complexity calculation unit 1201 calculates the sum of the absolute values of the difference between the pixel values of adjacent pixels as the feature value indicating the degree of complexity.

The depth image conversion unit 1202 has a function to move an edge location in an input depth image towards the background under the condition that the degree of complexity of the pixels towards the background does not exceed a predetermined threshold.

Figure 13:
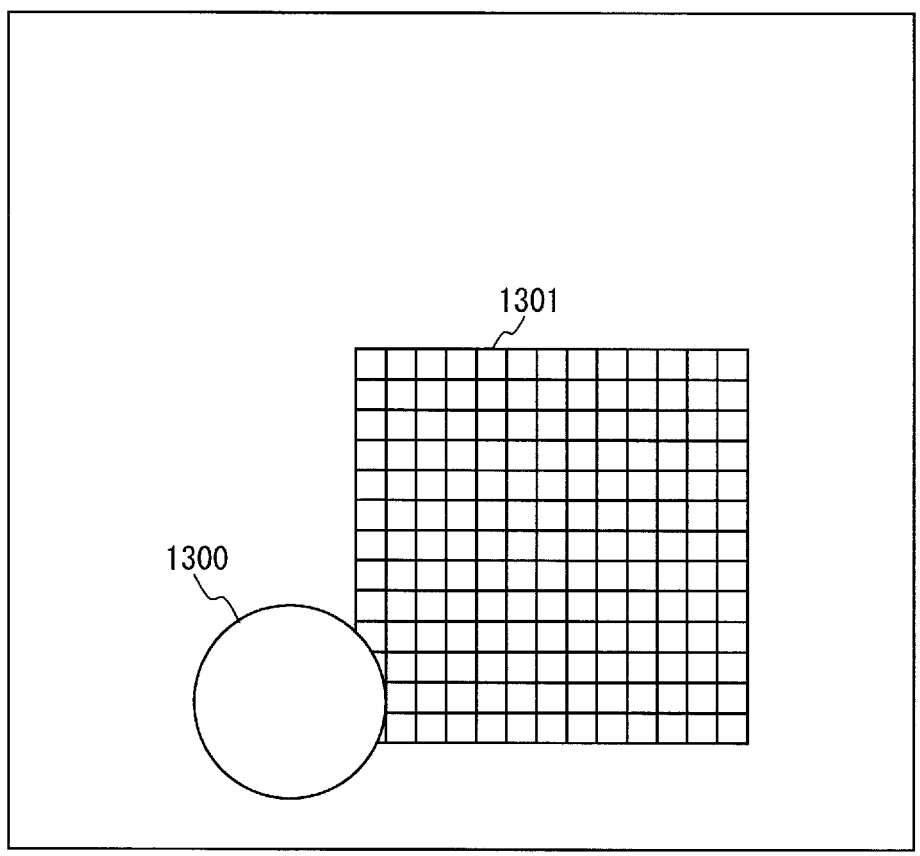
FIG. 13 is an example of an image that is input data for the image processing device 1200.
Figure 14:
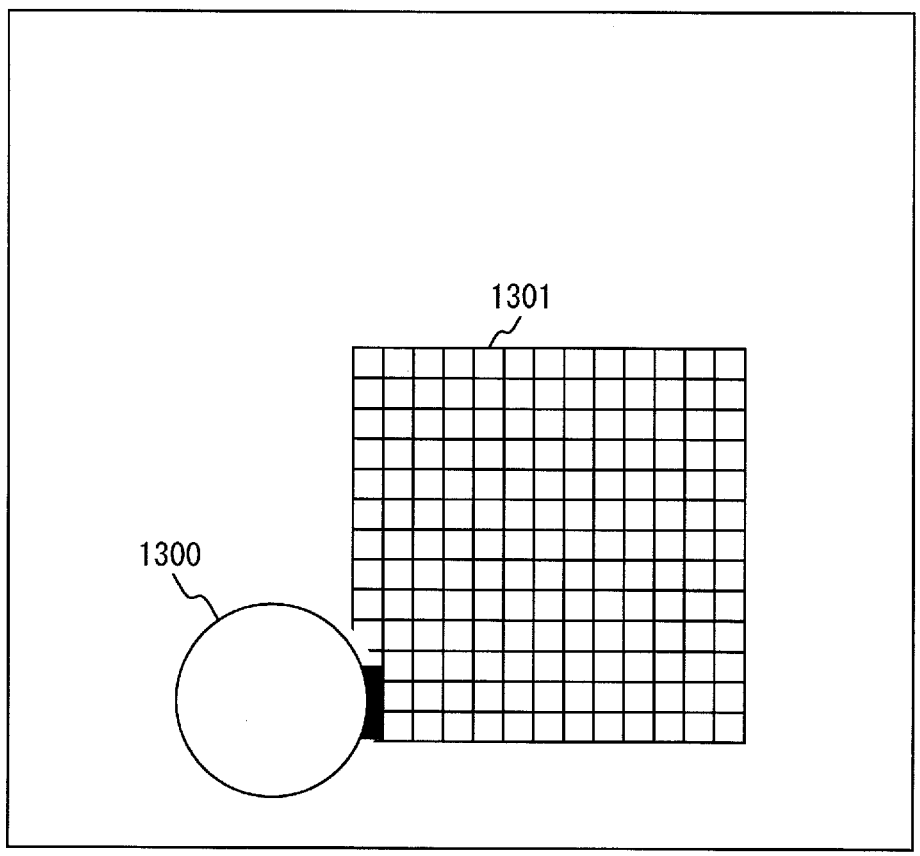
FIG. 14 illustrates how a complex background blurs, yielding a distorted image.

FIG. 13 is an example of an image that is input data for the image processing device 1200. As illustrated in FIG. 13, an object 1300 is an object that exhibits little pixel change, whereas an object 1301 is an object that exhibits complex pixel change. The object 1300 is positioned in the foreground, and the object 1301 is positioned in the background. In the depth image for this image, if the edge location is moved towards the background, i.e. towards the object 1301, and pixels are then shifted using the depth image after edge location movement, a missing pixel region occurs with the object 1301. If pixel interpolation is performed on this missing pixel region, the complex background object will be stretched out. In other words, as shown in FIG. 14, the complex object becomes blurred, yielding a distorted image with degraded overall image quality.

The depth image conversion unit 1202 of the present embodiment performs edge movement only when the background object is not complex, but rather exhibits little pixel change, thereby preventing a complex background object from being stretched out and the quality of the entire image from degrading.

The pixel shift unit 102 and the pixel interpolation unit 103 have the same structure as the image processing device 100 of Embodiment 1, and therefore a description thereof is omitted.

Figure 15:
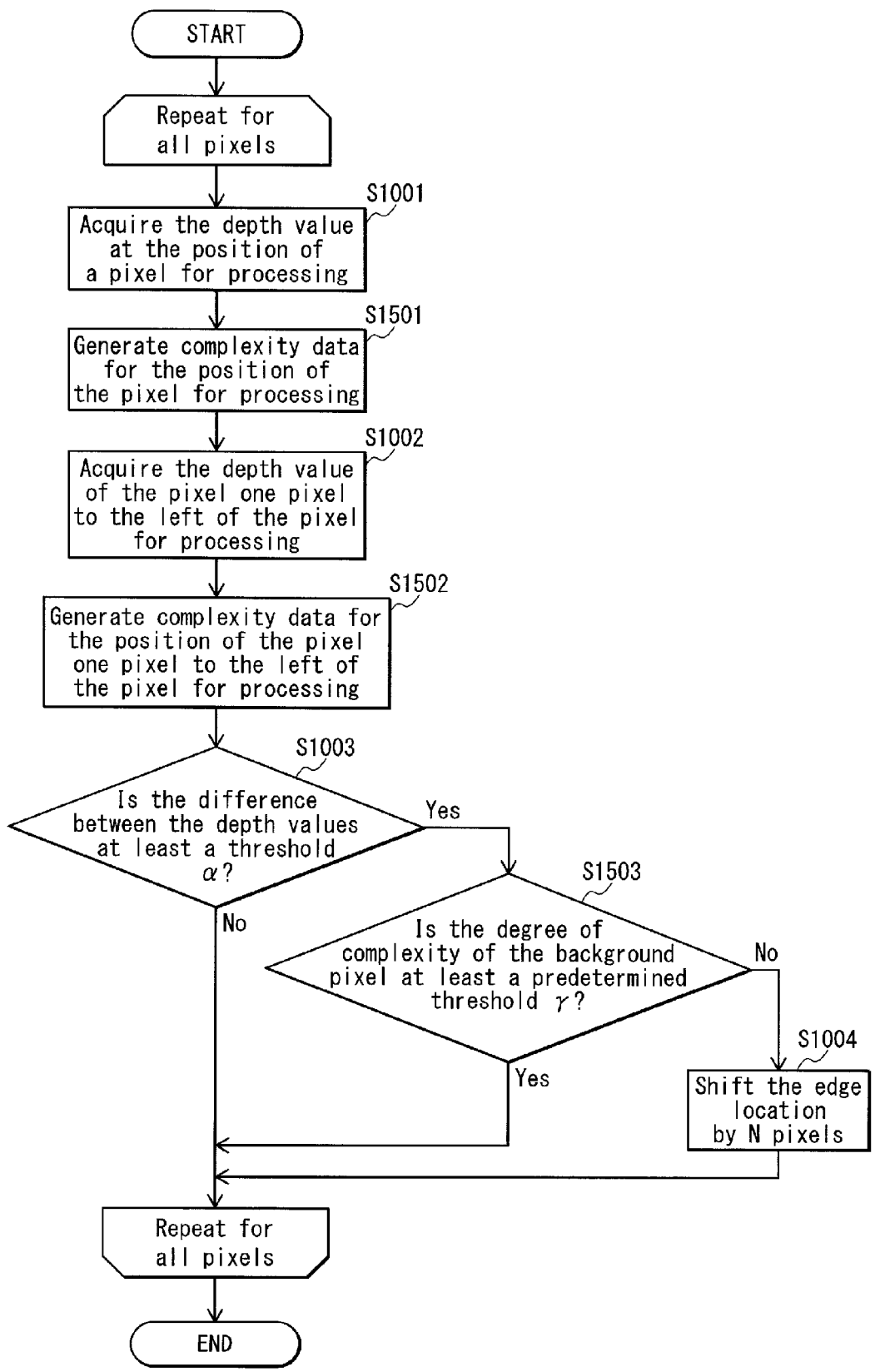
FIG. 15 is a flowchart illustrating the flow of depth image conversion in Embodiment 2.

Next, the differences in depth image conversion from Embodiment 1 are described. FIG. 15 is a flowchart illustrating the flow of depth image conversion in Embodiment 2. Operations that are the same as operations of the image processing device 100 of Embodiment 1 illustrated in FIG. 10 are provided with the same labels.

As illustrated in FIG. 15, the depth image conversion unit 1202 first acquires the depth value (A) at the position of a pixel for processing from the input depth image (step S1001). Next, the complexity calculation unit 1201 generates complexity data for the position of the pixel for processing (step S1501). Then, after step S1501, the depth image conversion unit 1202 acquires the depth value (B) at the position of the pixel one pixel to the left of the pixel for processing from the input depth image (step S1002). The complexity calculation unit 1201 then generates complexity data for the position of the pixel one pixel to the left of the pixel for processing (step S1502).

The depth image conversion unit 1202 then determines whether the difference between the depth value (B) at the position of the pixel one pixel to the left of the pixel for processing and the depth value (A) at the position of a pixel for processing is at least a predetermined threshold (a), i.e. whether $\alpha \le B-A$ (step S1003). If the difference is at least $\alpha$ (step S1003, YES), the depth image conversion unit 1202 determines whether the degree of complexity of the background pixel is at least a predetermined threshold ($\gamma$) (step S1503).

If the degree of complexity of the background pixel is not at least $\gamma$ (step S1503, YES), the background object is determined not to be complex, and the depth image conversion unit 1202 shifts the edge location by N pixels to the right (towards the background) (step S1004).

If the degree of complexity of the background pixel is at least $\gamma$ (step S1503, YES), the background object is determined to be complex, and the depth image conversion unit 1202 does not perform pixel shifting. The processing from step S1001 through step S1503 is repeated for all of the pixels in the image. This concludes the description of depth image conversion.

With the above embodiment, edge movement is performed only when the background object is not complex, but rather exhibits little pixel change, thereby preventing a complex background object from being stretched out and the quality of the entire image from degrading.

Embodiment 3

Like the image processing device 100 according to Embodiment 1, the image processing device according to Embodiment 3 moves an edge location of the depth image towards the background, shifts pixels using the depth image after edge location movement, and subsequently interpolates a missing pixel region, yielded by the pixel shift, where no pixels exist. When performing processing for edge location movement, the image processing device according to Embodiment 3 calculates the degree of complexity of a foreground pixel and of a background pixel and compares the calculated degree of complexity of the foreground pixel with the calculated degree of complexity of the background pixel. The image processing device performs edge movement processing under the condition that the degree of complexity of the foreground pixel is higher than the degree of complexity of the background pixel. By only moving the edge location towards the background when the foreground object is more complex than the background object, the image processing device prevents an object that is more complex than the foreground object from being stretched out and degrading image quality.

Figure 16:
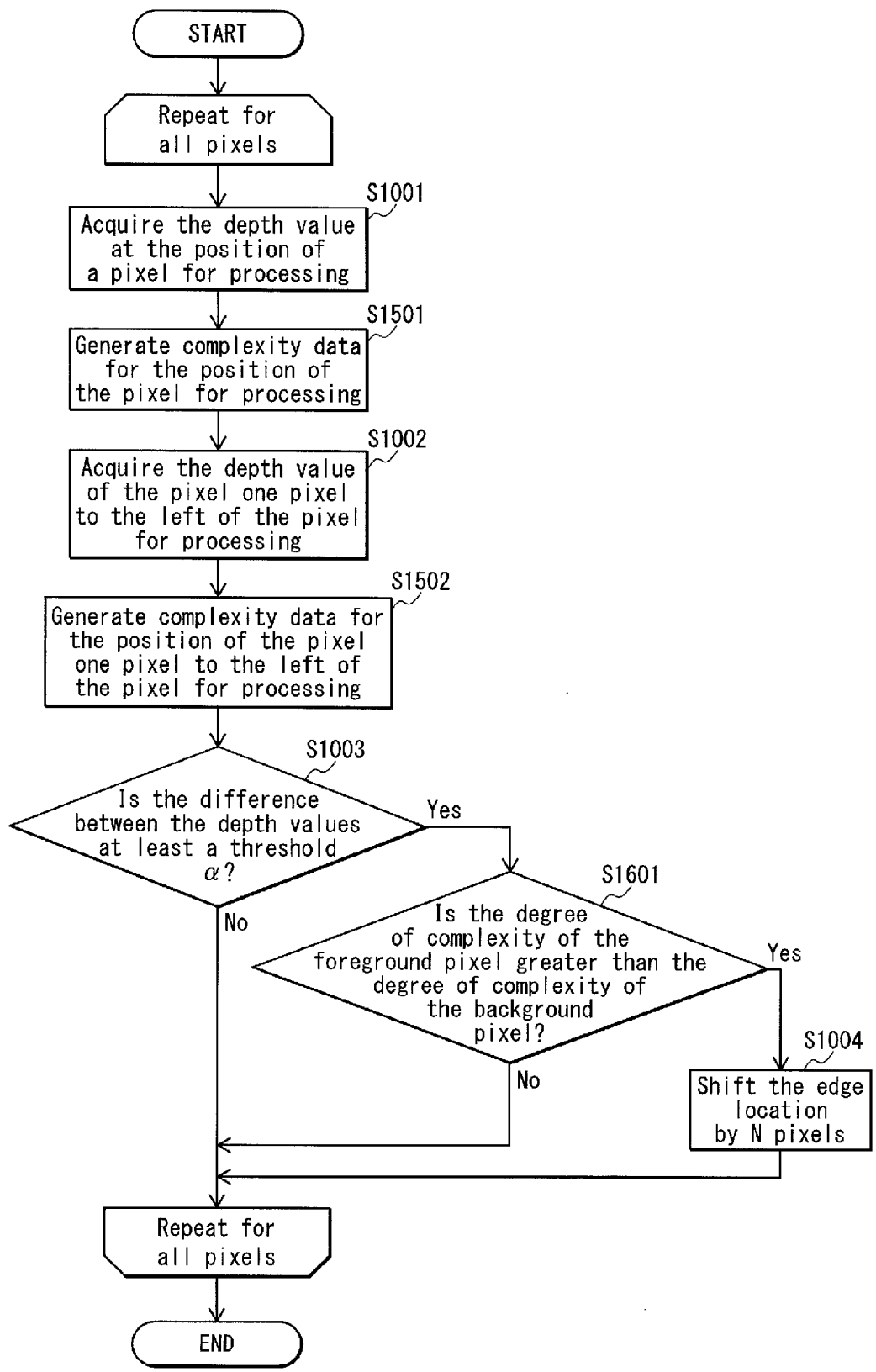
FIG. 16 is a flowchart illustrating the flow of depth image conversion in Embodiment 3.

FIG. 16 is a flowchart illustrating the flow of depth image conversion in Embodiment 3. Portions that are the same as in the depth image conversion of Embodiment 2 illustrated in FIG. 15 are provided with the same labels. As illustrated in FIG. 16, the depth image conversion unit 1202 first acquires the depth value (A) at the position of a pixel for processing from the input depth image (step S1001). Next, the complexity calculation unit 1201 generates complexity data for the position of the pixel for processing (step S1501). Then, after step S1501, the depth image conversion unit 1202 acquires the depth value (B) at the position of the pixel one pixel to the left of the pixel for processing from the input depth image (step S1002). The complexity calculation unit 1201 then generates complexity data for the position of the pixel one pixel to the left of the pixel for processing (step S1502).

The depth image conversion unit 1202 then determines whether the difference between the depth value (B) at the position of the pixel one pixel to the left of the pixel for processing and the depth value (A) at the position of a pixel for processing is at least a predetermined threshold (a), i.e. whether α≤B−A (step S1003). If the difference is at least α (step S1003, YES), the depth image conversion unit 1202 compares the degree of complexity of the foreground pixel and the degree of complexity of the background pixel (step S1601).

If the degree of complexity of the foreground pixel is greater than the degree of complexity of the background pixel (step S1601, YES), the depth image conversion unit 1202 shifts the edge location by N pixels to the right (towards the background) (step S1004). If the degree of complexity of the foreground pixel is not greater than the degree of complexity of the background pixel (step S1601, NO), the depth image conversion unit 1202 does not shift pixels. The processing from step S1001 through step S1601 is repeated for all of the pixels in the image. This concludes the description of depth image conversion.

With the above embodiment, edge movement is performed only when the background object is not more complex than the foreground object, but rather exhibits little pixel change, thereby preventing a background object that is more complex than a foreground object from being stretched out and the quality of the entire image from degrading.

Embodiment 4

Like the image processing device 100 according to Embodiment 1, the image processing device according to Embodiment 4 moves an edge location of the depth image towards the background, shifts pixels using the depth image after edge location movement, and subsequently interpolates a missing pixel region, yielded by the pixel shift, where no pixels exist. A characteristic of the image processing device according to Embodiment 4 is the performance of edge location movement by referring to the degree of complexity of the previous frame. Frame by frame, this prevents alternate display of a distorted image in which the foreground object is blurred by interpolation and a distorted image in which the background object is blurred by interpolation, thus preventing a degradation of quality of moving images due to flickering.

Figure 17:
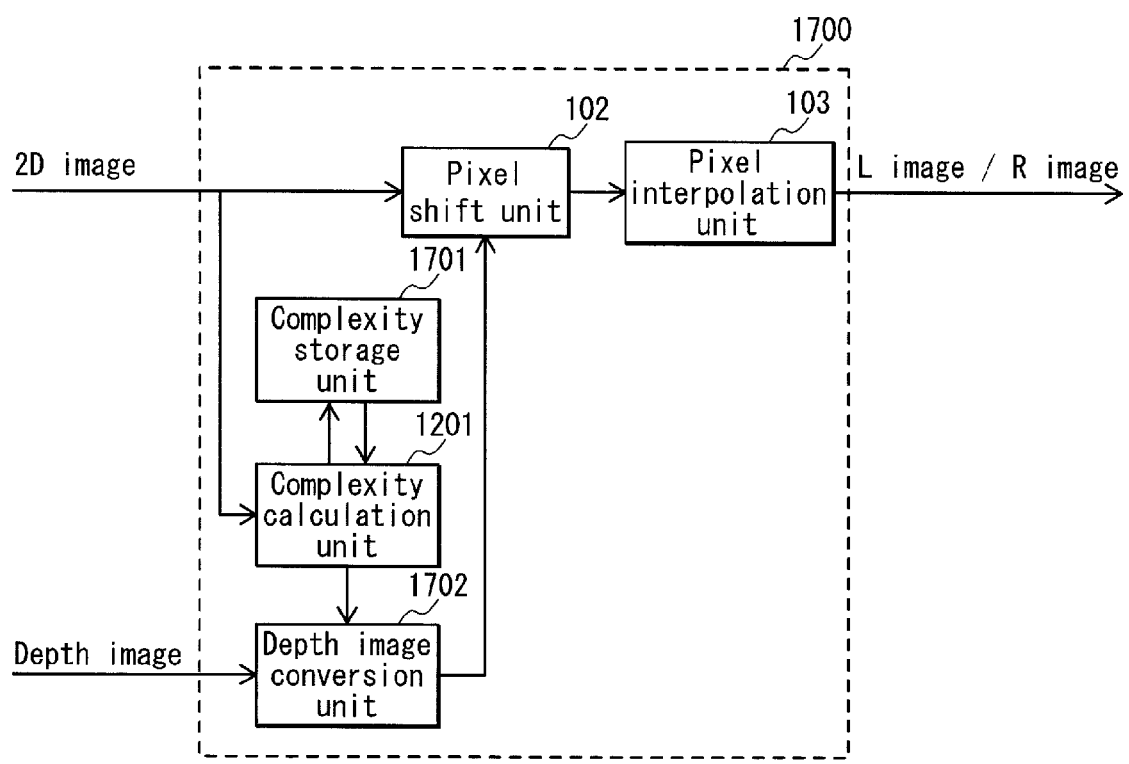
FIG. 17 is a block diagram illustrating an example of the structure of an image processing device 1700 according to Embodiment 4.

FIG. 17 is a block diagram illustrating an example of the structure of an image processing device 1700 according to Embodiment 4. Components having the same structure as the image processing device 1200 of Embodiment 1 illustrated in FIG. 12 are provided with the same labels. As illustrated in FIG. 17, the image processing device 1700 includes a complexity storage unit 1701, a depth image conversion unit 1702, a complexity calculation unit 1201, a pixel shift unit 102, and a pixel interpolation unit 103.

The complexity storage unit 1701 has a function to store whether each pixel in a foreground object of the previous frame is more or less complex than the pixel towards the background. If the pixel in the foreground object is more complex than the pixel towards the background, the complexity storage unit 1701 stores a value of one. If the pixel in the foreground object is not more complex than the pixel towards the background, the complexity storage unit 1701 stores a value of zero.

The depth image conversion unit 1702 has a function to perform edge location movement while referring to the degree of complexity of the previous frame. Specifically, if the pixel at the position for processing in a frame is not more complex than the pixel towards the background, the depth image conversion unit 1702 does not perform edge location movement.

When the edge location is moved from the foreground to the background alternately frame by frame, an image in which the foreground object is blurred by interpolation, distorting the image, and an image in which the background object is blurred by interpolation, distorting the image, are alternately displayed, causing flickering and degradation of quality of the moving images. By referring to the degree of complexity of the previous frame when performing movement of the edge location, the depth image conversion unit 1702 of the present embodiment prevents the edge location from being moved from the foreground to the background alternately frame by frame, thus preventing degradation of quality of the moving images due to flickering.

The complexity calculation unit 1201, the pixel shift unit 102, and the pixel interpolation unit 103 have the same structure as the image processing device 1200 of Embodiment 2, and therefore a description thereof is omitted.

Figure 18:
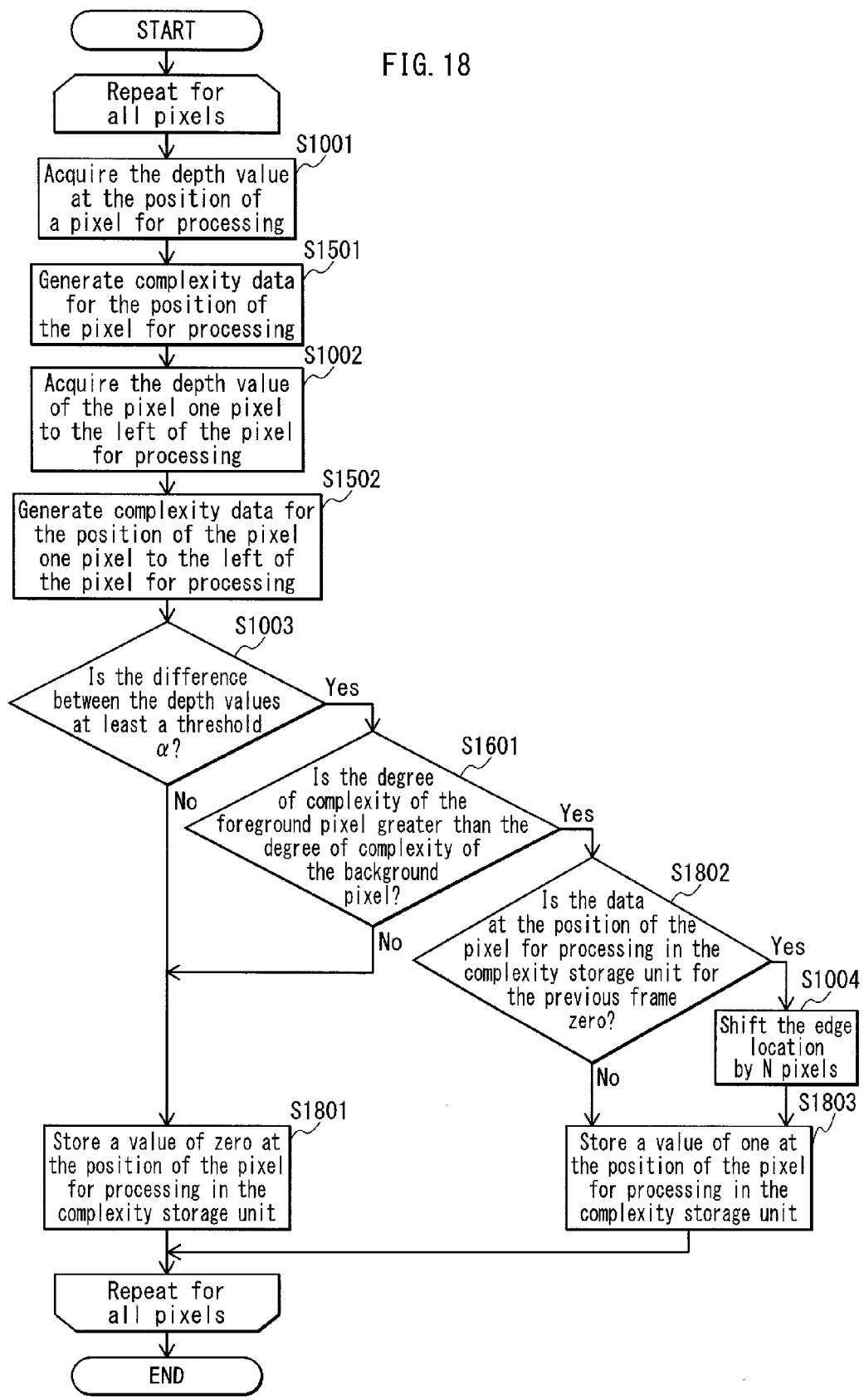
FIG. 18 is a flowchart illustrating the flow of depth image conversion in Embodiment 4.

Next, the differences in depth image conversion from Embodiment 2 are described. FIG. 18 is a flowchart illustrating the flow of depth image conversion in Embodiment 4. Portions that are the same as in the depth image conversion of Embodiment 2 illustrated in FIG. 15 are provided with the same labels.

As illustrated in FIG. 18, the depth image conversion unit 1702 first acquires the depth value (A) at the position of a pixel for processing from the input depth image (step S1001). Next, the complexity calculation unit 1201 generates complexity data for the position of the pixel for processing (step S1501). Then, after step S1501, the depth image conversion unit 1702 acquires the depth value (B) at the position of the pixel one pixel to the left of the pixel for processing from the input depth image (step S1002). The complexity calculation unit 1201 then generates complexity data for the position of the pixel one pixel to the left of the pixel for processing (step S1502).

The depth image conversion unit 1702 then determines whether the difference between the depth value (B) at the position of the pixel one pixel to the left of the pixel for processing and the depth value (A) at the position of a pixel for processing is at least a predetermined threshold (α), i.e. whether α≤B−A (step S1003). If the difference is not at least α (step S1003, NO), the complexity storage unit 1701 stores zero at the position of the pixel for processing (step S1801).

If the difference is at least α (step S1003, YES), the depth image conversion unit 1702 compares the degree of complexity of the foreground pixel and the degree of complexity of the background pixel (step S1601). If the degree of complexity of the foreground pixel is not larger than the degree of complexity of the background pixel (step S1601, NO), the complexity storage unit 1701 stores zero at the position of the pixel for processing (step S1801).

If the degree of complexity of the foreground pixel is greater than the degree of complexity of the background pixel (step S1601, YES), the depth image conversion unit 1702 refers to the data at the position of the pixel for processing in the complexity storage unit 1701 for the previous frame (step S1802). If the data at the position of the pixel for processing in the complexity storage unit 1701 for the previous frame is zero (step S1802, YES), no movement of the edge location is performed, and the complexity storage unit 1701 stores a value of one at the position of the pixel for processing (step S1803). When the data for the position of the pixel for processing in the complexity storage unit 1701 for the previous frame is not zero (step S1802, NO), the depth image conversion unit 1702 shifts the edge location by N pixels to the right (towards the background) (step S1004).

Subsequently, the complexity storage unit 1701 stores a value of one at the position of the pixel for processing (step S1803). The processing from step S1001 through step S1803 is repeated for all of the pixels in the image. This concludes the description of depth image conversion.

The present embodiment refers to the degree of complexity of the previous frame when performing movement of the edge location. Frame by frame, this prevents alternate display of a distorted image in which the foreground object is blurred by interpolation and a distorted image in which the background object is blurred by interpolation, thus preventing a degradation of quality of moving images due to flickering.

Embodiment 5

Like the image processing device 100 according to Embodiment 1, the image processing device according to Embodiment 5 moves an edge location of the depth image towards the background, shifts pixels using the depth image after edge location movement, and subsequently interpolates a missing pixel region, yielded by the pixel shift, where no pixels exist. A characteristic of the image processing device according to Embodiment 5 is the designation of a processing range and the performance of edge location movement over the designated processing range.

Figure 19:
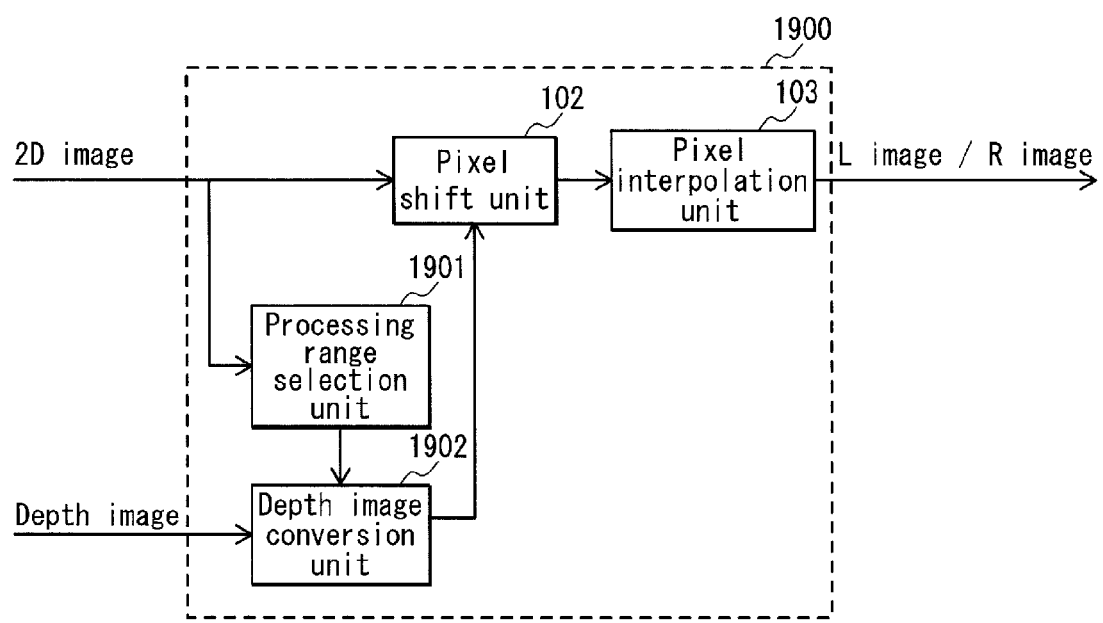
FIG. 19 is a block diagram illustrating an example of the structure of an image processing device 1900 according to Embodiment 5.

FIG. 19 is a block diagram illustrating an example of the structure of an image processing device 1900 according to Embodiment 5. Components having the same structure as the image processing device 100 of Embodiment 1 illustrated in FIG. 1 are provided with the same labels. As illustrated in FIG. 19, the image processing device 1900 includes a processing range selection unit 1901, a depth image conversion unit 1902, a pixel shift unit 102, and a pixel interpolation unit 103.

The processing range selection unit 1901 has a function to designate an image range over which to perform depth image conversion.

Figure 20:
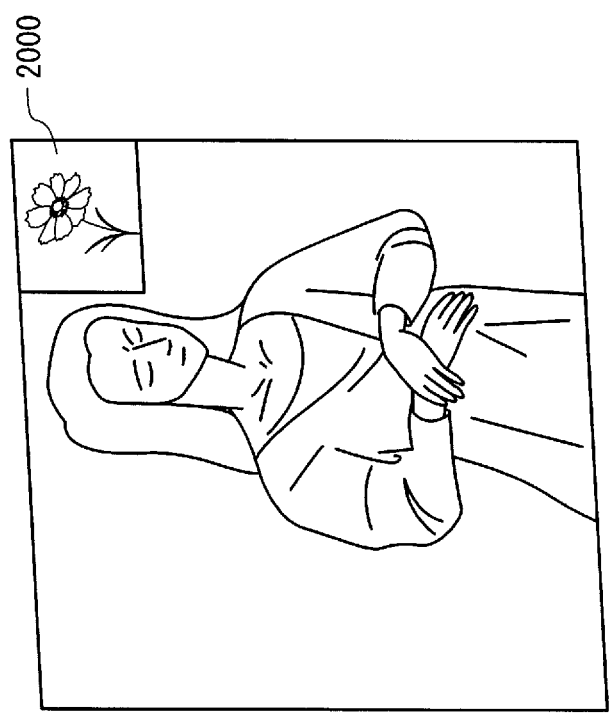
FIG. 20 illustrates an example of an image range selected by a processing range selection unit 1901.

FIG. 20 illustrates an example of an image range selected by the processing range selection unit 1901. In FIG. 20, the region other than a window region 2001 in the upper right is designated as the processing range. In this case, movement of the edge location is not performed in the window region 2001 during depth image conversion.

The depth image conversion unit 1902 has a function to perform depth image conversion on the image range designated by the processing range selection unit 1901. In the example in FIG. 20, the depth image conversion unit 1902 outputs a depth image in which edge movement has been performed on the region excluding the window region 2001.

The pixel shift unit 102 and the pixel interpolation unit 103 have the same structure as the image processing device 100 of Embodiment 1, and therefore a description thereof is omitted.

As described above, with the present embodiment, images from multiple viewpoints can be generated while performing edge movement over a designated image range.

Embodiment 6

Like the image processing device 100 according to Embodiment 1, the image processing device according to Embodiment 6 moves an edge location of the depth image towards the background, shifts pixels using the changed depth image after edge location movement, and subsequently interpolates a missing pixel region, yielded by the pixel shift, where no pixels exist. A characteristic of the image processing device according to Embodiment 6 is that after the depth image conversion unit performs edge location movement in the depth image, the pixels forming an edge are smoothed.

Figure 21:
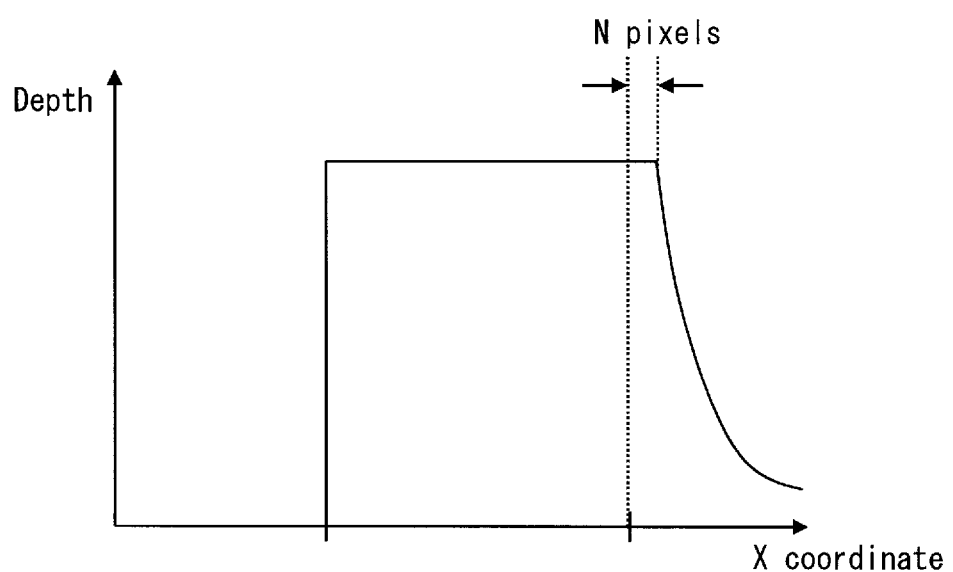
FIG. 21 illustrates depth image conversion performed by a depth image conversion unit in an image processing device according to Embodiment 6.

FIG. 21 illustrates depth image conversion performed by a depth image conversion unit in an image processing device according to Embodiment 6. FIG. 21 illustrates the depth image resulting from depth image conversion performed on the depth image in FIG. 3. As illustrated in FIG. 21, the depth image conversion unit first shifts the edge location by N pixels towards the background and then smooths the pixels that form an edge. Specifically, the depth image conversion unit smooths the edge with a Gaussian filter. As a result, the size of the missing pixel region that occurs due to pixel shifting is reduced. The target of pixel interpolation is thereby reduced, thus lessening the amount of image degradation due to pixel interpolation.

Figure 22:
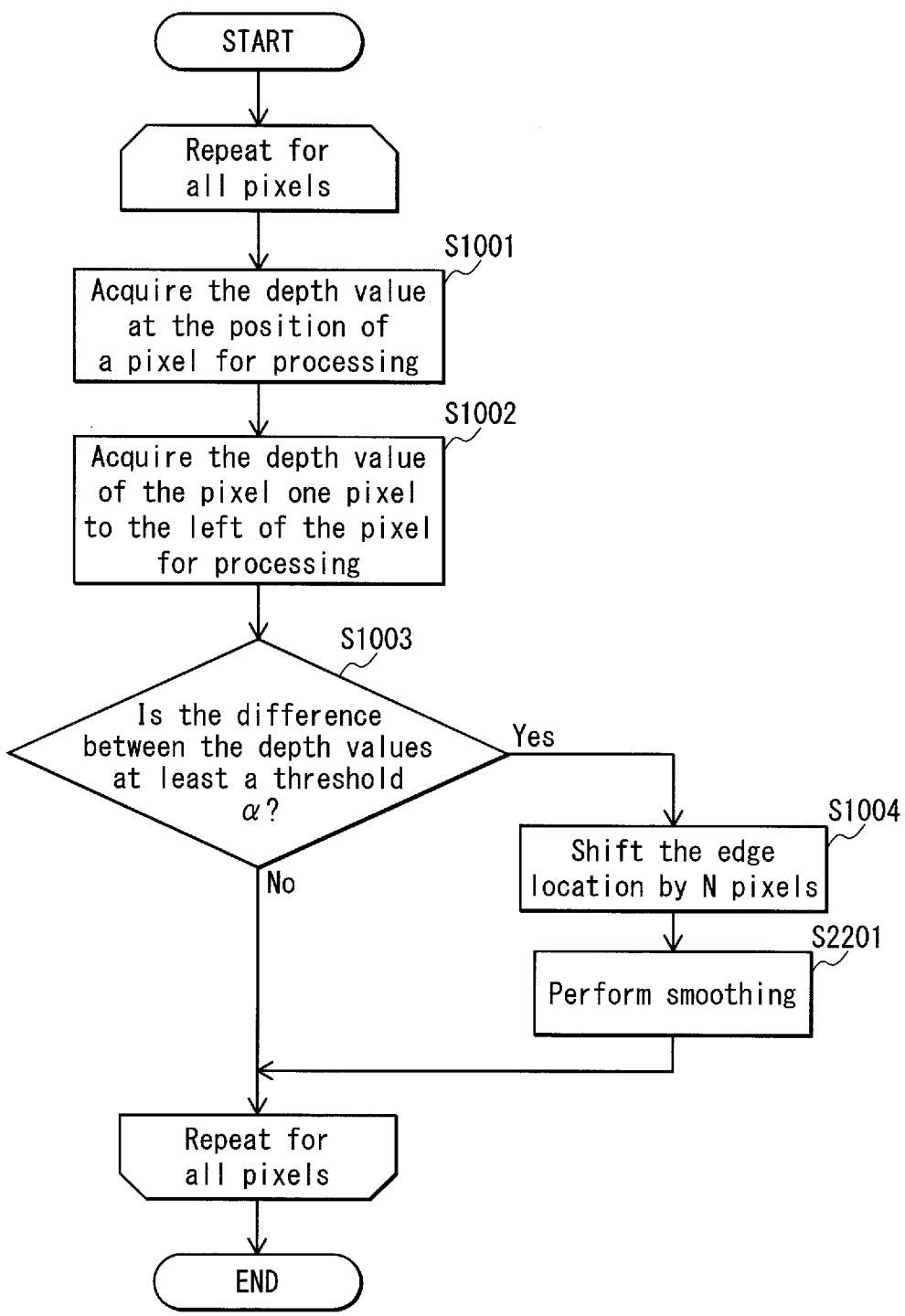
FIG. 22 is a flowchart illustrating the flow of depth image conversion in Embodiment 6.

FIG. 22 is a flowchart illustrating the flow of depth image conversion in Embodiment 6. Operations that are the same as operations of the image processing device 100 of Embodiment 1 illustrated in FIG. 10 are provided with the same labels.

As illustrated in FIG. 22, the depth image conversion unit 101 first acquires the depth value (A) at the position of a pixel for processing from the input depth image (step S1001). Next, the depth image conversion unit 101 acquires the depth value (B) at the position of the pixel one pixel to the left of the pixel for processing from the input depth image (step S1002). The depth image conversion unit 101 then determines whether the difference between the depth value (B) at the position of the pixel one pixel to the left of the pixel for processing and the depth value (A) at the position of a pixel for processing is at least a predetermined threshold (a), i.e. whether $\alpha \le B-A$ (step S1003).

If the difference is at least $\alpha$ (step S1003, YES), the depth image conversion unit 101 shifts the edge location by N pixels (step S1004). After edge location movement, the depth image conversion unit 101 smooths the pixels that form an edge (step S2201). If the difference is not at least $\alpha$ (step S1003, NO), the depth image conversion unit 101 does not shift the edge location for that pixel. The processing from step S1001 through step S1004 is repeated for all of the pixels in the image. This concludes the description of depth image conversion.

As described above, the present embodiment first moves the edge location by N pixels towards the background and then smooths the pixels that form an edge. As a result, the size of the missing pixel region that occurs due to pixel shifting is reduced. The target of pixel interpolation is thereby reduced, thus lessening the amount of image degradation due to pixel interpolation.

Embodiment 7

Like the image processing device 100 according to Embodiment 1, the image processing device according to Embodiment 7 moves an edge location of the depth image towards the background, shifts pixels using the depth image after edge location movement, and subsequently interpolates a missing pixel region, yielded by the pixel shift, where no pixels exist. The image processing device according to Embodiment 7 differs by allowing the parameter $\alpha$, which determines the edge in a depth image, and the parameter N, which determines the number of pixels to move an edge in the depth image, to be set and changed by user operation.

Figure 23:
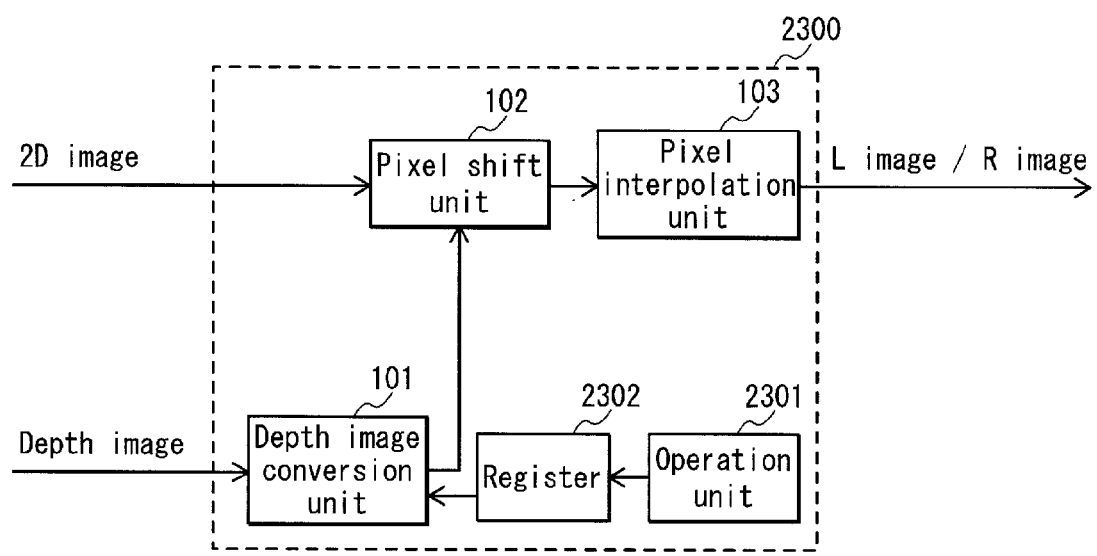
FIG. 23 is a block diagram illustrating an example of the structure of an image processing device 2300.

FIG. 23 is a block diagram illustrating an example of the structure of an image processing device 2300 according to Embodiment 7. Components having the same structure as the image processing device 100 of Embodiment 1 illustrated in FIG. 1 are provided with the same labels. As illustrated in FIG. 23, the image processing device 2300 includes a depth image conversion unit 101, a pixel shift unit 102, a pixel interpolation unit 103, an operation unit 2301, and a register 2302.

The operation unit 2301 has a function to receive input by user operation. Specifically, the operation unit 2301 receives input such as the value of the parameter α, which determines the edge in a depth image, and of the parameter N, which determines the number of pixels to move an edge in the depth image. The register 2302 has a function to store the value of the parameter α, which determines the edge in a depth image, and of the parameter N, which determines the number of pixels to move an edge in the depth image, as input via the operation unit 2301.

The depth image conversion unit 101 reads the stored value of the parameter α, which determines the edge in a depth image, and of the parameter N, which determines the number of pixels to move an edge in the depth image, from the register 2302 and then converts the depth image.

Figure 24:
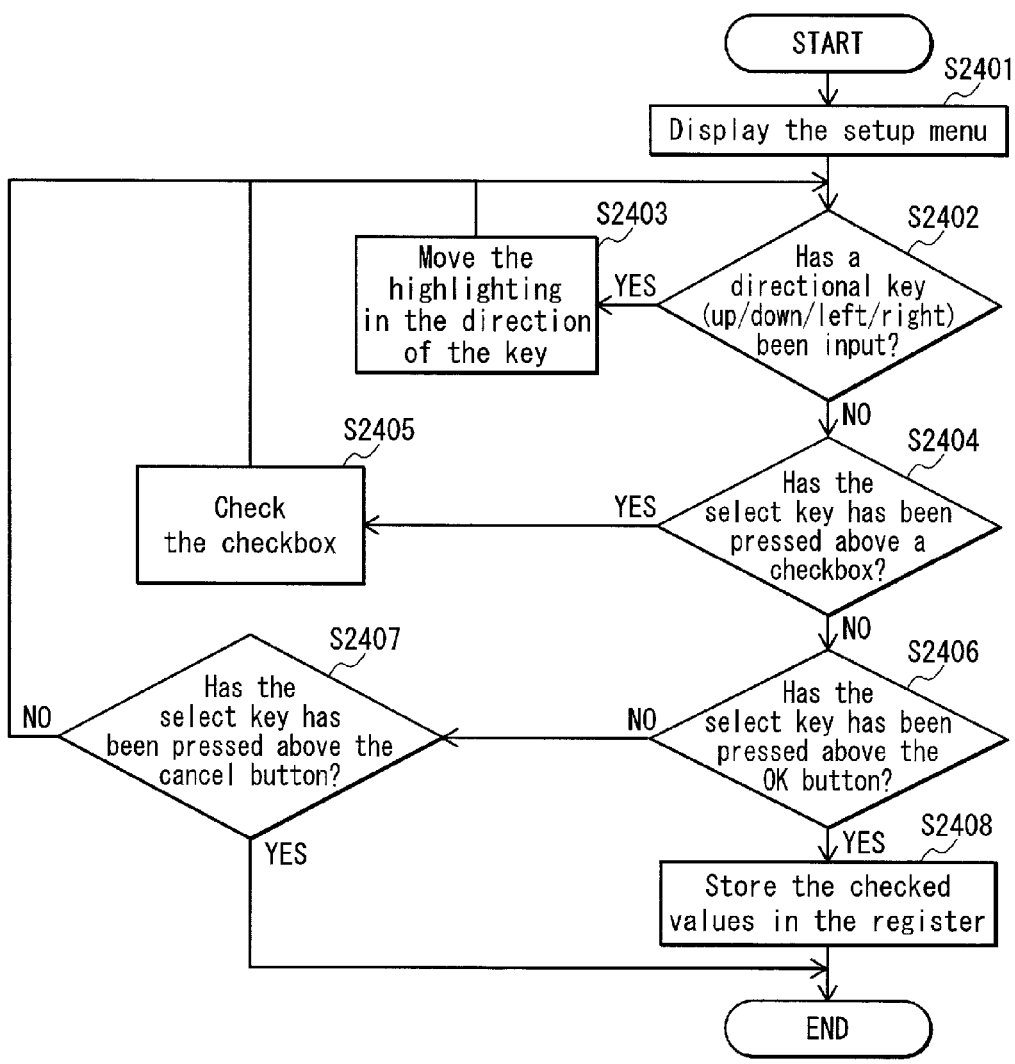
FIG. 24 is a flowchart illustrating the flow of processing by an operation unit 2301 to receive parameters.

FIG. 24 is a flowchart illustrating the flow of processing by the operation unit 2301 to receive parameters.

Figure 25:
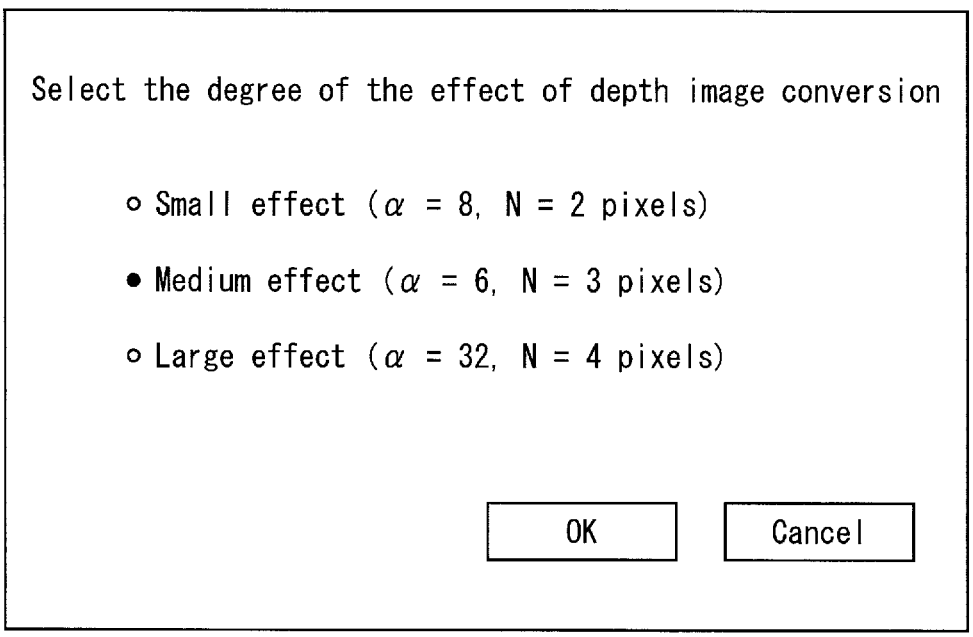
FIG. 25 illustrates an example of a setup menu screen.

As illustrated in FIG. 24, the operation unit 2301 first displays a setup menu screen, as illustrated in FIG. 25, to the user (step S2401).

In the example illustrated in FIG. 25, the menu screen allows for selection of the degree of the effect of depth image conversion from among three levels: "small effect", "medium effect", and "large effect". If the user selects "small effect", the parameters stored in the register 2302 are α=8 and N=2 pixels. If the user selects "medium effect", the parameters stored in the register 2302 are α=16 and N=3 pixels. If the user selects "large effect", the parameters stored in the register 2302 are α=32 and N=4.

After the setup menu screen is displayed, the operation unit 2301 determines whether the user has input a directional key (up/down/left/right) (step S2402).

If a directional key has been input (step S2402, YES), the operation unit 2301 moves the highlighting in the direction of the key (step S2403).

If a directional key has not been input (step S2402, NO), the operation unit 2301 determines whether the select key has been pressed above a checkbox (step S2404).

If the select key has been pressed above a checkbox (step S2404, YES), the operation unit 2301 checks the checkbox (step S2405).

If the select key has not been pressed (step S2404, NO), the operation unit 2301 determines whether the select key has been pressed above an OK button (step S2406).

If the select key has not been pressed (step S2406, NO), the operation unit 2301 determines whether the select key has been pressed above a cancel button (step S2407).

If the select key has been pressed above the OK button (step S2406, YES), the checked values are stored in the register 2302 (step S2408).

In the above description, the degree of the effect of depth image conversion is selected from among three levels: "small effect", "medium effect", and "large effect". Alternatively, the user may be allowed to directly input the value of the parameter α, which determines the edge in a depth image, and of the parameter N, which determines the number of pixels to move an edge in the depth image.

Figure 26:
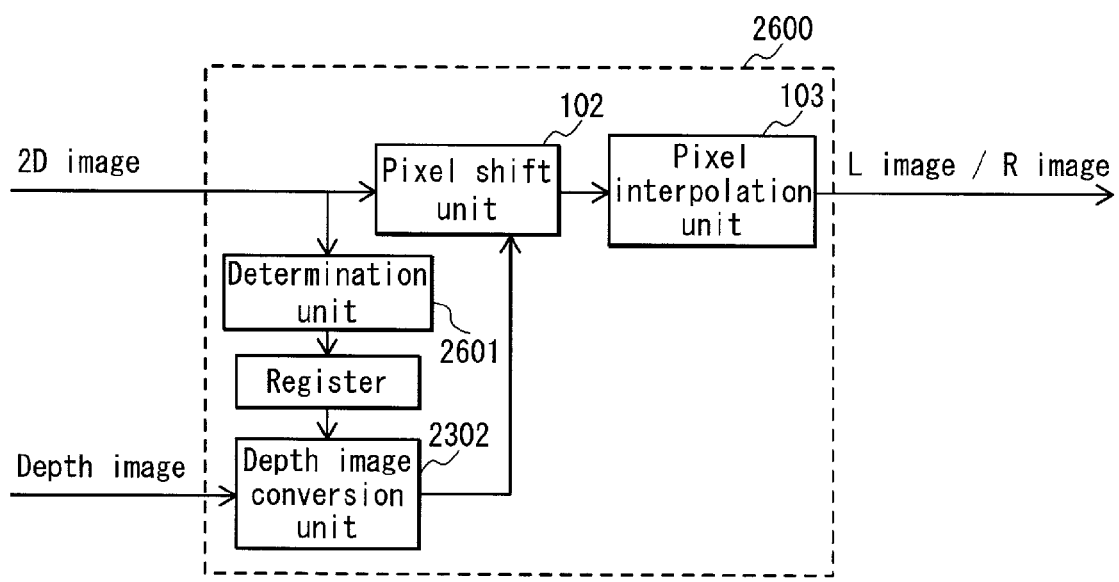
FIG. 26 is a block diagram illustrating an example of the structure of an image processing device 2600.

Furthermore, instead of directly inputting the value of the parameter α, which determines the edge in a depth image, and of the parameter N, which determines the number of pixels to move an edge in the depth image, the type of 2D image may be determined, and based on this determination, the parameter α, which determines the edge in a depth image, and the parameter N, which determines the number of pixels to move an edge in the depth image, may be stored in the register. FIG. 26 is a block diagram illustrating an example of the structure of an image processing device 2600. Components having the same structure as the image processing device 100 of Embodiment 1 illustrated in FIG. 1 are provided with the same labels. As illustrated in FIG. 26, the image processing device 2600 includes a depth image conversion unit 101, a pixel shift unit 102, a pixel interpolation unit 103, a determination unit 2601, and a register 2302.

The determination unit 2601 has a function to determine the type of the input 2D image, and based on the determination, select the value of the parameter α, which determines the edge in a depth image, and of the parameter N, which determines the number of pixels to move an edge in the depth image. The determination unit 2601 stores the selected parameters α and N in the register 2302.

The determination unit 2601 analyzes the input 2D image and determines the type of image, such as "person", "scenery", or "animation". This determination of the type of image can be made by, for example, extracting skin color to determine whether the subject of the 2D image is a person.

Based on the determination of the type of image, the determination unit 2601 selects the value of the parameter α, which determines the edge in a depth image, and of the parameter N, which determines the number of pixels to move an edge in the depth image. For example, if the image is of a person, it can be assumed that the person should be shown jumping forward to a great degree. Therefore, parameters with a large degree of the effect of depth image conversion are selected, such as α=32 and N=4 pixels.

On the other hand, if the image is of scenery, it can be assumed that the amount of the forward jump is less than image of a person. Therefore, parameters with a small degree of the effect of depth image conversion are selected, such as α=8 and N=2 pixels.

With the present embodiment, the user selects the value of the parameter α, which determines the edge in a depth image, and of the parameter N, which determines the number of pixels to move an edge in the depth image, thus allowing for processing of images with a desired effect of depth image conversion.

Modifications

While the present invention has been described according to the above embodiments, the present invention is in no way limited to these embodiments. The present invention also includes cases such as the following.

(a) The present invention may be an application execution method as disclosed by the processing steps described in the embodiments. The present invention may also be a computer program that includes program code causing a computer to perform the above processing steps.

Figure 27:
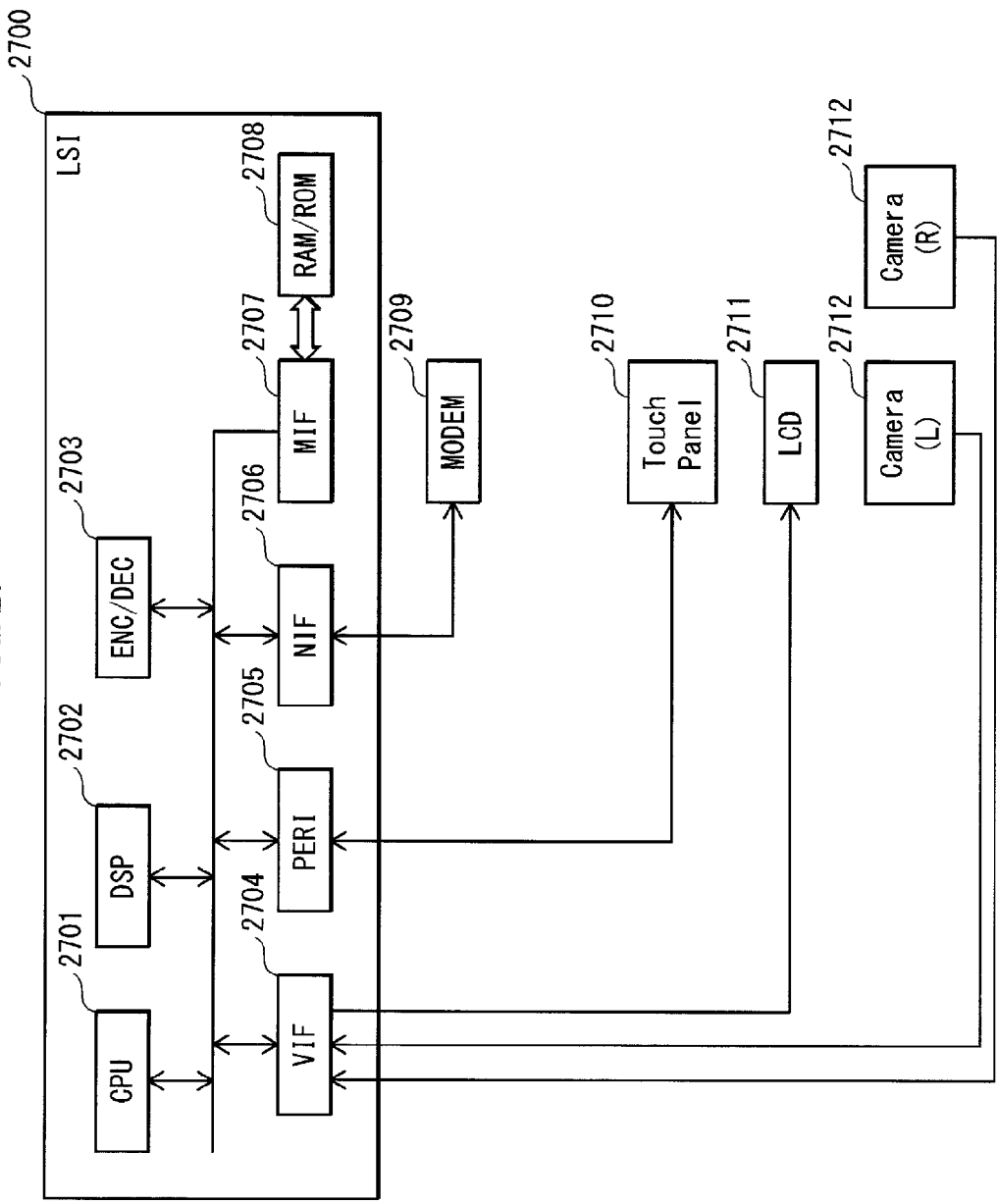
FIG. 27 illustrates an example of implementing the image processing device according to an aspect of the present invention as an LSI.

(b) The present invention may be a package of an IC, an LSI, or another integrated circuit that performs application execution control. FIG. 27 illustrates an example of implementing the image processing device according to an aspect of the present invention as an LSI. As illustrated in FIG. 27, the LSI 2700 for example includes a CPU 2701 (Central Processing Unit), a DSP 2702 (Digital Signal Processor), an ENC/DEC 2703 (Encoder/Decoder), a VIF 2704 (Video Interface), a PERI 2705 (Peripheral Interface), a NIF 2706

(Network Interface), a MIF 2707 (Memory Interface), and a RAM/ROM 2708 (Random Access Memory/Read Only Memory).

The processing steps described in the embodiments are stored as program code in the RAM/ROM 2708. The program code stored in the RAM/ROM 2708 is read via the MIF 2707 and executed by the CPU 2701 and the DSP 2702. This allows for implementation of the functions of the image processing device described in the embodiments.

Furthermore, the VIF 2704 is connected to an image pickup device, such as a Camera(L) 2712 and a Camera(R) 2713, and a display device, such as an LCD 2714 (Liquid Crystal Display), and can acquire and output stereoscopic images and stereoscopic video. The ENC/DEC 2703 encodes and decodes acquired or generated stereoscopic images and stereoscopic video. The PERI 2705 is connected with an operation device, such as a Touch Panel 2710, and controls these peripheral devices. The NIF 2706 is connected to a MODEM 2709 or the like for connection with an external network.

This package is incorporated for use into a variety of devices, so that the devices can achieve the functions described in the embodiments. The method of integration is not limited to LSI, and a dedicated communication circuit or a general-purpose processor may be used. A Field Programmable Gate Array (FPGA), which is an LSI that can be programmed after manufacture, or a reconfigurable processor, which is an LSI whose connections between internal circuit cells and settings for each circuit cell can be reconfigured, may be used. Additionally, if technology for integrated circuits that replaces LSIs emerges, owing to advances in semiconductor technology or to another derivative technology, the integration of functional blocks may naturally be accomplished using such technology. Among such technology, the application of biotechnology or the like is possible.

While referred to here as an LSI, depending on the degree of integration, the terms IC, system LSI, super LSI, or ultra LSI are also used.

(c) The present invention can be implemented as a next-generation image display device, such as a digital television, a mobile telephone, or a personal computer, provided with the image processing device of the above embodiments. The present invention can also be implemented as a playback device, such as a BD player, a DVD player, or the like, provided with the image processing device of the above embodiments. In this case, the 2D image and depth image that are the target of processing are acquired, for example, over broadcast waves or over a network.

(d) In the above embodiments, the pixel interpolation unit interpolates the missing pixel region by linear interpolation, but the present invention is not limited in this way. For example, the missing pixel region may be interpolated with bicubic interpolation, which determines pixel values by performing 3D interpolation using the values of 16 neighboring pixels.

(e) In the above embodiments, the complexity calculation unit calculates the sum of the absolute values of the difference between the pixel values of adjacent pixels as the feature value indicating the degree of complexity, but the present invention is not limited in this way. For example, the image may be converted into frequencies, and the high-frequency component may be calculated as the feature value indicating the degree of complexity.

(f) In Embodiment 4, the degree of complexity of the previous frame is referred to when performing movement of the edge location, but the present invention is not limited in this way. For example, movement of the edge location may be performed by referring to the degree of complexity of the previous complex frame.

(g) In Embodiment 6, edges are smoothed with a Gaussian filter, but the present invention is not limited in this way. For example, the edge location in the depth image may be smoothed using a median filter.

(h) In the above embodiments, the depth image is a grayscale image indicating the depth of each pixel as one of 256 levels of brightness, from 0 to 255, but the present invention is not limited in this way. For example, a grayscale image with 128 levels of brightness, from 0 to 127, may be used.

(i) In the above embodiments, the pixel shift amount is calculated assuming that the distance S from the viewer to the display screen is three times the height H of the display screen (3H), but the present invention is not limited in this way. For example, a distance sensor, such as a Time Of Flight (TOF) sensor, may be used to calculate the distance S from the viewer to the display screen.

(j) In the above embodiments, the pixel shift amount is calculated assuming that the interpupillary distance e is 6.4 cm, the average value for an adult male, but the present invention is not limited in this way. For example, it may be determined whether the viewer is an adult or a child, and whether the viewer is male or female, and the pixel shift amount may be calculated based on the corresponding interpupillary distance e.

(k) The above embodiments and modifications may be combined with one another.

INDUSTRIAL APPLICABILITY

The image processing device of the present invention moves an edge location where the depth value of the depth image is discontinuous, and based on the depth image with the moved edge location, shifts the coordinates of pixels in the original image and performs interpolation on a missing pixel region. The image processing device of the present invention is therefore useful, as it allows for interpolation of the missing pixel region produced by pixel shifting without noticeable blurring and distortion of a foreground object, so that an image from a different view than the original image can be generated.

REFERENCE SIGNS LIST

100 image processing device
101 depth image conversion unit
102 pixel shift unit
103 pixel interpolation unit
1101 depth image generation unit
1201 complexity calculation unit
1701 complexity storage unit
1901 processing range selection unit
2301 operation unit
2302 register
2601 determination unit

The invention claimed is:
1. An image processing device for generating images from multiple viewpoints, by shifting coordinates of pixels in an original image, in order to provide depth indicated by a depth image composed of a pixel region defined by a plurality of pixels, a value of each of the pixels in the depth image indicating the depth of a corresponding one of the pixels in the original image, the image processing device comprising a memory and a processor, the processor being configured to execute:
  conversion processing to convert the depth image by searching within the pixel region composing the depth image for edge pixels that constitute an edge of an object and shifting, in a predetermined direction, coordinates of the pixels in the depth image that are surrounded by the edge pixels;
  generation processing to generate a viewpoint image from a different viewpoint than the original image by calculating a parallax that provides the depth indicated by the depth image converted by the conversion processing and shifting the coordinates of the pixels in the original image by a number of pixels corresponding to the parallax; and
  interpolation processing to interpolate an occlusion, occurring due to pixel shifting, in the generated viewpoint image, wherein:
  the conversion processing includes accepting a level selection from a user when the depth image is converted, and changing the number of pixels corresponding to the parallax according to the level selection,
  background pixel regions of the original image appear, due to the conversion processing, at a side to a left of the occlusion and a side to a right of the occlusion in generated viewpoint images, one of the background pixel regions between the edge of the object and the occlusion having a width according to the parallax, and
  the interpolation processing includes linear interpolation using pixel values of the background pixel regions located at the side to the left of the occlusion and the side to the right of the occlusion.

2. The image processing device of claim 1, wherein between a foreground region and a background region separated by an edge in the depth image, the conversion processing includes shifting the coordinates of the pixels surrounded by the edge pixels towards the background region.

3. The image processing device of claim 2, wherein:
the processor is configured to calculate a degree of complexity of an object in the original image, and
the conversion processing includes converting the depth image under a condition that the degree of complexity of the background region is at most a predetermined value.

4. The image processing device of claim 2, wherein:
the processor is configured to calculate a degree of complexity of an object in the original image, and
the conversion processing includes converting the depth image under a condition that the degree of complexity of the foreground region is higher than the degree of complexity of the background region.

5. The image processing device of claim 2, wherein:
the memory is configured to store a degree of complexity of the original image in a predetermined previous frame, and
the conversion processing includes converting the depth image under a condition that the degree of complexity of a foreground object in the original image in the predetermined previous frame is at least a predetermined value.

6. The image processing device of claim 1, wherein the conversion processing includes searching for the edge within the depth image by searching for one of the pixels whose depth value differs by at least a predetermined value from the depth value of another one of the pixels that is horizontally adjacent to the one of the pixels.

7. The image processing device of claim 6, further comprising:
a register for storing a parameter determining the edge within the depth image, wherein
the conversion processing includes searching for the edge within the depth image by comparing a difference from the depth value of the other one of the pixels that is horizontally adjacent to the one of the pixels with the parameter stored in the register.

8. The image processing device of claim 7, wherein:
the image processing device is configured to receive user operations, and
the parameter, stored in the register, that determines the edge within the depth image is set by user operations received by the image processing device.

9. The image processing device of claim 7, wherein:
the processor is configured to determine a type of original image data, and
the parameter, stored in the register, that determines the edge within the depth image is based on the type of the original image data determined by the processor.

10. The image processing device of claim 6, wherein the conversion processing includes smoothing the pixels surrounded by the edge pixels after shifting the coordinates of the pixels surrounded by the edge pixels.

11. The image processing device of claim 1, further comprising:
a register for storing a parameter determining a number of pixels by which to shift the coordinates of the pixels in the depth image, wherein
the conversion processing includes shifting the coordinates of the pixels in the depth image that are surrounded by the edge pixels by the number of pixels determined by the parameter and stored in the register.

12. The image processing device of claim 1, wherein:
the processor is configured to select an image range, within the depth image, over which to perform depth image conversion, and
the conversion processing includes converting the depth image over the selected image range.

13. The image forming device of claim 1, wherein:
the original image is a current frame from a plurality of frames in a time series;
the image processing device stores a frame processing history;
the frame processing history is data indicating, for each previous frame, whether each of the pixels in a depth image thereof has been shifted, in association with a position of the pixel in the depth image;
the searching within the pixel region composing the depth image for the edge pixels in the conversion processing includes, for each pixel of the depth image corresponding to the current frame, selecting the pixel as a current pixel, determining whether the current pixel satisfies a plurality of conditions, and updating the frame processing history;
the determining including:
(i) determining whether a depth difference between the current pixel and pixels of the depth image around the current pixel exceeds a threshold value,
(ii) determining whether complexity of foreground pixels of the depth image is greater than complexity of background pixels of the depth image, and
(iii) determining whether the frame processing history includes an indication that a pixel at the same position as the current pixel was subjected to processing in a previous frame;

wherein, when results of (i) and (ii) are negative, the frame processing history is updated to indicate that shifting was not performed at the position corresponding to the current pixel, wherein, when results of (i) and (ii) are positive, the frame processing history is updated to indicate that shifting was performed at the position corresponding to the current pixel; and wherein the edge pixels are composed of pixels for which the results of (i), (ii), and (iii) are positive.

14. An image processing method for generating images from multiple viewpoints, by shifting coordinates of pixels in an original image, in order to provide depth indicated in a depth image composed of a pixel region defined by a plurality of pixels, a value of each of the pixels in the depth image indicating the depth of a corresponding one of the pixels in the original image, the image processing method comprising the steps of:

converting the depth image by searching within the pixel region composing the depth image for edge pixels that constitute an edge of an object and shifting, in a predetermined direction, coordinates of the pixels in the depth image that are surrounded by the edge pixels;

generating a viewpoint image from a different viewpoint than the original image by calculating a parallax that provides the depth indicated by the converted depth image and shifting the coordinates of the pixels in the original image by a number of pixels corresponding to the parallax; and interpolating an occlusion, occurring due to pixel shifting, in the generated viewpoint image, wherein:

when the depth image is converted, a level selection from a user is accepted, and the number of pixels corresponding to the parallax is changed according to the level selection, background pixel regions of the original image appear, due to the converting, at a side to a left of the occlusion and a side to a right of the occlusion in generated viewpoint images, one of the background pixel regions between the edge of the object and the occlusion having a width according to the parallax, and the interpolating is linear interpolating using pixel values of the background pixel regions located at the side to the left of the occlusion and the side to the right of the occlusion.

15. A non-transitory computer-readable storage medium storing a program for causing a computer to perform image processing for generating images from multiple viewpoints, by shifting coordinates of pixels in an original image, in order to provide depth indicated in a depth image composed of a pixel region defined by a plurality of pixels, a value of each of the pixels in the depth image indicating the depth of a corresponding one of the pixels in the original image, the program causing the computer to perform the steps of:

converting the depth image by searching within the pixel region composing the depth image for edge pixels that constitute an edge of an object and shifting, in a predetermined direction, coordinates of the pixels in the depth image that are surrounded by the edge pixels;

generating a viewpoint image from a different viewpoint than the original image by calculating a parallax that provides the depth indicated by the converted depth image and shifting the coordinates of the pixels in the original image by a number of pixels corresponding to the parallax; and interpolating an occlusion, occurring due to pixel shifting, in the generated viewpoint image, wherein:

when the depth image is converted, a level selection from a user is accepted, and the number of pixels corresponding to the parallax is changed according to the level selection, background pixel regions of the original image appear, due to the converting, at a side to a left of the occlusion and a side to a right of the occlusion in generated viewpoint images, one of the background pixel regions between the edge of the object and the occlusion having a width according to the parallax, and the interpolating is linear interpolating using pixel values of the background pixel regions located at the side to the left of the occlusion and the side to the right of the occlusion.

16. An integrated circuit used in image processing for generating images from multiple viewpoints, by shifting coordinates of pixels in an original image, in order to provide depth indicated in a depth image composed of a pixel region defined by a plurality of pixels, a value of each of the pixels in the depth image indicating the depth of a corresponding one of the pixels in the original image, the integrated circuit comprising a memory and a processor, the processor being configured to execute:

conversion processing to convert the depth image by searching within the pixel region composing the depth image for edge pixels that constitute an edge of an object and shifting, in a predetermined direction, coordinates of the pixels in the depth image that are surrounded by the edge pixels;

generation processing to generate a viewpoint image from a different viewpoint than the original image by calculating a parallax that provides the depth indicated by the depth image converted by the conversion processing and shifting the coordinates of the pixels in the original image by a number of pixels corresponding to the parallax; and interpolation processing to interpolate an occlusion, occurring due to pixel shifting, in the generated viewpoint image, wherein:

the conversion processing includes accepting a level selection from a user when the depth image is converted, and changing the number of pixels corresponding to the parallax according to the level selection, background pixel regions of the original image appear, due to the conversion processing, at a side to a left of the occlusion and a side to a right of the occlusion in generated viewpoint images, one of the background pixel regions between the edge of the object and the occlusion having a width according to the parallax, and the interpolation processing includes linear interpolation using pixel values of the background pixel regions located at the side to the left of the occlusion and the side to the right of the occlusion.

17. An image processing device for generating images from multiple viewpoints, by shifting coordinates of pixels in an original image, in order to provide depth indicated by a depth image composed of a pixel region defined by a plurality of pixels, a value of each of the pixels in the depth image indicating the depth of a corresponding one of the pixels in the original image, the image processing device comprising a memory and a processor, the processor being configured to execute:

conversion processing to convert the depth image by searching within the pixel region composing the depth image for edge pixels that constitute an edge of an object and shifting, in a predetermined direction, coordinates of the pixels in the depth image that are surrounded by the edge pixels;
generation processing to generate a viewpoint image from a different viewpoint than the original image by calculating a parallax that provides the depth indicated by the depth image converted by the conversion processing and shifting the coordinates of the pixels in the original image by a number of pixels corresponding to the parallax; and
interpolation processing to interpolate an occlusion, occurring due to pixel shifting, in the generated viewpoint image, wherein:
the original image is a current frame from a plurality of frames in a time series,
the image processing device stores a frame processing history,
the frame processing history is data indicating, for each previous frame, whether each of the pixels in a depth image thereof has been shifted, in association with a position of the pixel in the depth image,
the searching within the pixel region composing the depth image for the edge pixels in the conversion processing includes, for each pixel of the depth image corresponding to the current frame, selecting the pixel as a current pixel, determining whether the current pixel satisfies a plurality of conditions, and updating the frame processing history,
the determining including:
(i) determining whether a depth difference between the current pixel and pixels of the depth image around the current pixel exceeds a threshold value,
(ii) determining whether complexity of foreground pixels of the depth image is greater than complexity of background pixels of the depth image, and
(iii) determining whether the frame processing history includes an indication that a pixel at the same position as the current pixel was subjected to processing in a previous frame,
wherein, when results of (i) and (ii) are negative, the frame processing history is updated to indicate that shifting was not performed at the position corresponding to the current pixel,
wherein, when results of (i) and (ii) are positive, the frame processing history is updated to indicate that shifting was performed at the position corresponding to the current pixel, and
wherein the edge pixels are composed of pixels for which the results of (i), (ii), and (iii) are positive.

* * * * *